United States Patent

Hathaway

[15] 3,665,114

[45] May 23, 1972

[54] CARTRIDGE AND TAPE STRETCH PLACEMENT SYSTEM FOR VIDEO REPRODUCER AND/OR RECORDER

[72] Inventor: Richard A. Hathaway, Saratoga, Calif.

[73] Assignee: Cartridge Television, Inc., New York, N.Y.

[22] Filed: June 26, 1970

[21] Appl. No.: 50,059

[52] U.S. Cl. .................179/100.2 Z, 179/100.2 T, 242/199, 274/4 E

[51] Int. Cl.....................................G11b 5/52, G11b 23/08

[58] Field of Search.............................179/100.2 T, 100.2 Z; 242/55.19 A, 197, 200; 274/4 A, 4 G; 95/34 R, 31 CA

[56] References Cited

UNITED STATES PATENTS

| | | | |
|---|---|---|---|
| 3,417,938 | 12/1968 | Markakis et al. | 179/100.2 Z |
| 3,394,898 | 7/1968 | Laa | 274/4 E |
| 3,017,803 | 1/1962 | Sakaki | 242/199 |
| 3,467,339 | 9/1969 | Bradt | 242/197 |
| 3,549,823 | 12/1970 | Pastor | 179/100.2 Z |
| 3,482,839 | 12/1969 | Wolfner | 179/100.2 Z |

FOREIGN PATENTS OR APPLICATIONS

| | | | |
|---|---|---|---|
| 1,537,240 | 10/1966 | Germany | 179/100.2 T |

OTHER PUBLICATIONS

IBM Technical Disclosure Bulletin, V9, No. 8, pg. 68 Automatic Tape Threading–Johnson et al., Jan. 1967

*Primary Examiner*—Stanley M. Urynowicz, Jr.
*Assistant Examiner*—Jay P. Lucas
*Attorney*—Townsend and Townsend

[57] ABSTRACT

A tape transport apparatus of the type having a rotary head assembly and adapted for use with a tape cartridge. The apparatus includes a bucket for receiving a tape cartridge and for moving the same into an operative position adjacent to the rotary head assembly. Tape guides pull a stretch of the tape out of the cartridge and adjacent to the path of travel of the heads of the assembly. The bucket has means for releasing a reel brake in the cartridge. The apparatus includes means for opening a closure on the cartridge as the latter is moved by the bucket into its operative position.

7 Claims, 37 Drawing Figures

RICHARD A. HATHAWAY

INVENTOR.

BY

Townsend and Townsend

INVENTOR
RICHARD A. HATHAWAY
BY
Townsend and Townsend

INVENTOR
RICHARD A. HATHAWAY
BY
Townsend and Townsend

INVENTOR
RICHARD A. HATHAWAY
BY
Townsend and Townsend

INVENTOR
RICHARD A. HATHAWAY
BY
Townsend and Townsend

RICHARD A. HATHAWAY
INVENTOR.

BY

Townsend and Townsend

RICHARD A. HATHAWAY
INVENTOR.

BY

Townsend and Townsend

INVENTOR.
RICHARD A. HATHAWAY
BY
Townsend and Townsend

RICHARD A. HATHAWAY

INVENTOR.

BY

Townsend and Townsend

RICHARD A. HATHAWAY

INVENTOR.

BY

Townsend and Townsend

Patented May 23, 1972

3,665,114

12 Sheets-Sheet 11

RICHARD A. HATHAWAY
INVENTOR.

BY

Townsend and Townsend

Patented May 23, 1972 3,665,114

12 Sheets-Sheet 12

INVENTOR.
RICHARD A. HATHAWAY
BY
Townsend and Townsend

CARTRIDGE AND TAPE STRETCH PLACEMENT SYSTEM FOR VIDEO REPRODUCER AND/OR RECORDER

This invention relates to improvements in tape transports of the type utilizing a rotary head assembly and, more particularly, to a tape transport apparatus for use with a tape cartridge.

The present invention is directed to a tape transport apparatus which has an improved carriage mechanism for receiving a tape cartridge and for advancing the same into an operative position adjacent to a rotary head assembly. Thus, a stretch of the flexible magnetic tape carried by the cartridge is pulled out of the same and moved to a location extending along a portion of the arcuate path of travel of the heads of the assembly so that the heads can scan the tape. The tape is canted relative to the head path so that it is scanned along oblique tracks.

The carriage mechanism cooperates with a number of other elements of the apparatus to assure interchangeability of tape cartridges at all times. Thus, regardless of which cartridge is used with the apparatus, the tape of the cartridge is always properly presented to the scanning heads to carry out a record or playback operation. The carriage mechanism is constructed so that it requires only a few simple steps to place the cartridge in its operative position. Also, the apparatus can be automatically operated by the manipulation of suitable control means. Thus, the apparatus and the carriage mechanism can be used by persons having little or no experience in handling tape transport systems, thereby making the apparatus suitable as a video recorder and playback unit for consumer use.

The apparatus is especially suitable for use with reel-over-reel cartridges and accommodates cartridges of two different sizes. It operates to open a closure at one end of the cartridge automatically to expose the tape stretch to be drawn out of the same only when the cartridge is in its operative position. At other times, the closure is closed and latched to protect the tape and to facilitate storage of the cartridge. The carriage mechanism, when it receives the cartridge, automatically unlatches the closure and releases a brake holding the reels of the cartridge against rotation. When the carriage mechanism moves the cartridge out of its operative position, it automatically ejects the cartridge therefrom by moving it outwardly of the carriage mechanism to a location at which it can easily be grasped and separated from the mechanism.

The primary object of this invention is to provide an improved tape transport apparatus of the rotary head type which is adapted for use with a tape cartridge and which can be efficiently operated by persons having little or no skill in operating a tape transport, so that the apparatus is suitable for use as a vido recorder and playback unit adapted for consumer use.

Still another object of the present invention is to provide a carriage mechanism for presenting a tape cartridge to the tape transport apparatus of the aforesaid character wherein the mechanism requires only a few simple manual steps to position the cartridge properly with respect to the head assembly of the apparatus to thereby reduce the probability of malfunctions and to minimize maintenance thereon.

A further object of this invention is to provide a tape transport apparatus of the type described which is adapted to be used with a tape cartridge having a latched closure capable of being opened wherein the apparatus operates to unlatch the closure and to open the same automatically to minimize handling requirements and to protect the tape.

Other objects of this invention will become apparent as the following specification progresses, reference being had to the accompanying drawings for an illustration of an embodiment of the invention. IN THE DRAWINGS:

FIG. 1 is a vertical section of the tape transport apparatus of this invention;

FIGS. 2 and 2*a* are front and rear perspective views of the tape cartridge used with the apparatus;

Figure 3:
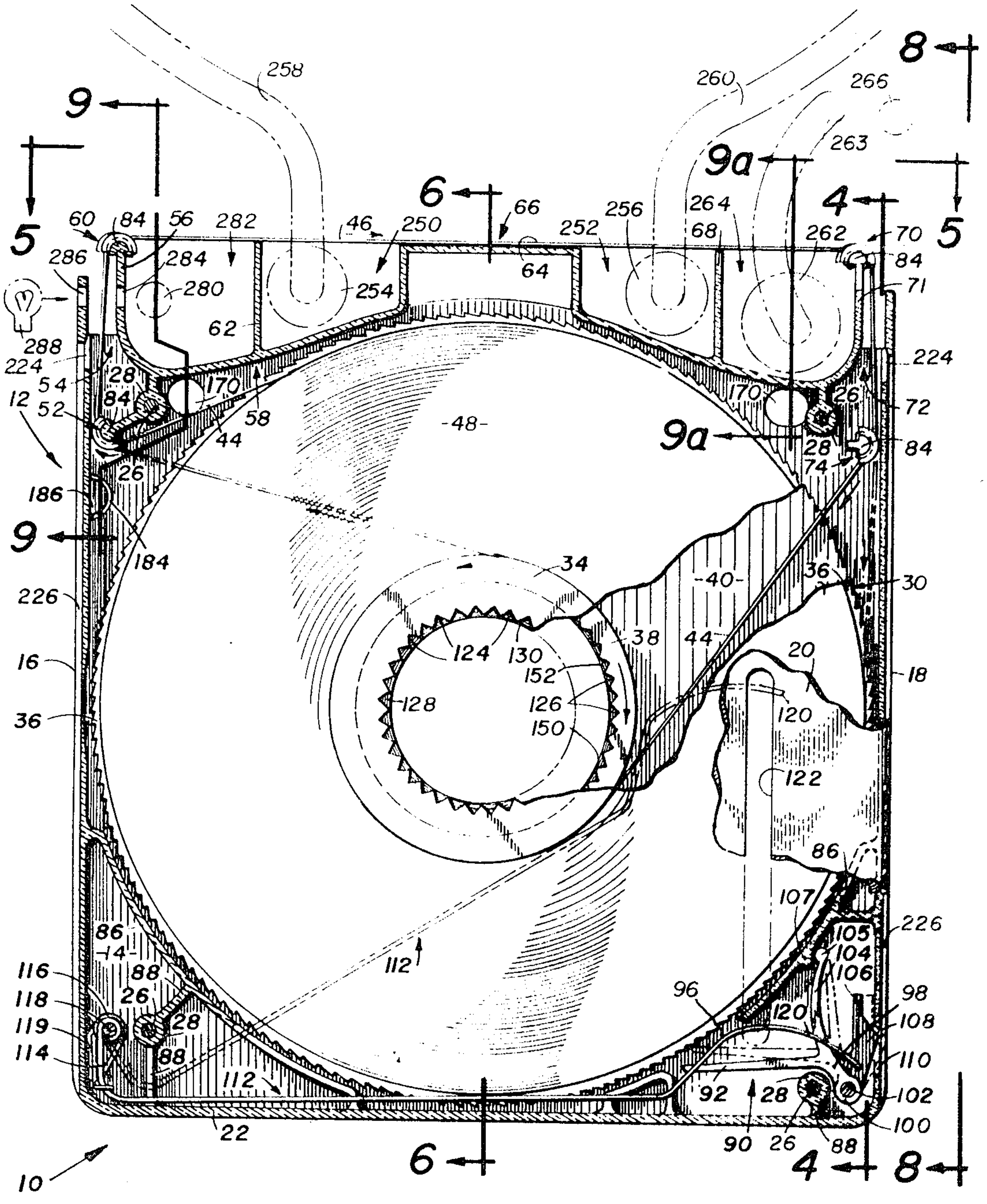
FIG. 3 is a vertical section of the tape cartridge.
Figures 4, 4A, 6:
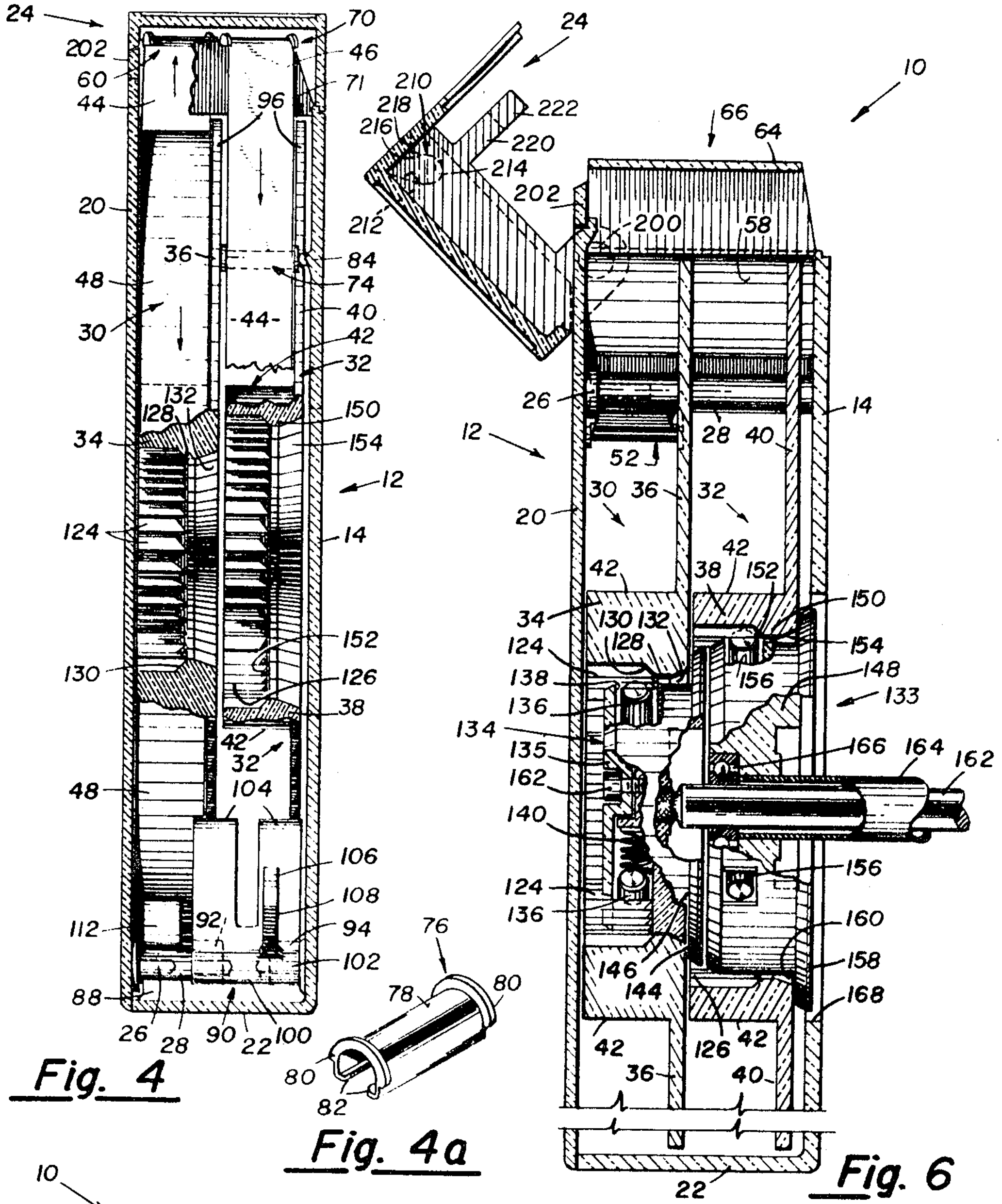
FIG. 4 is a cross-sectional view taken along line 4—4 of FIG. 3.
Figure 5:
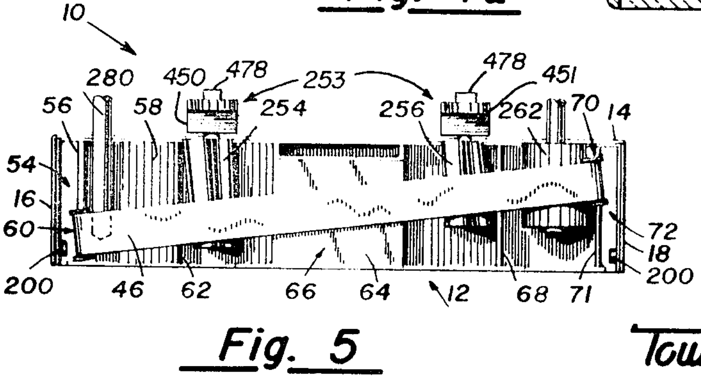
Figures 7, 8, 8A, 8B, 8C, 9, 9A:
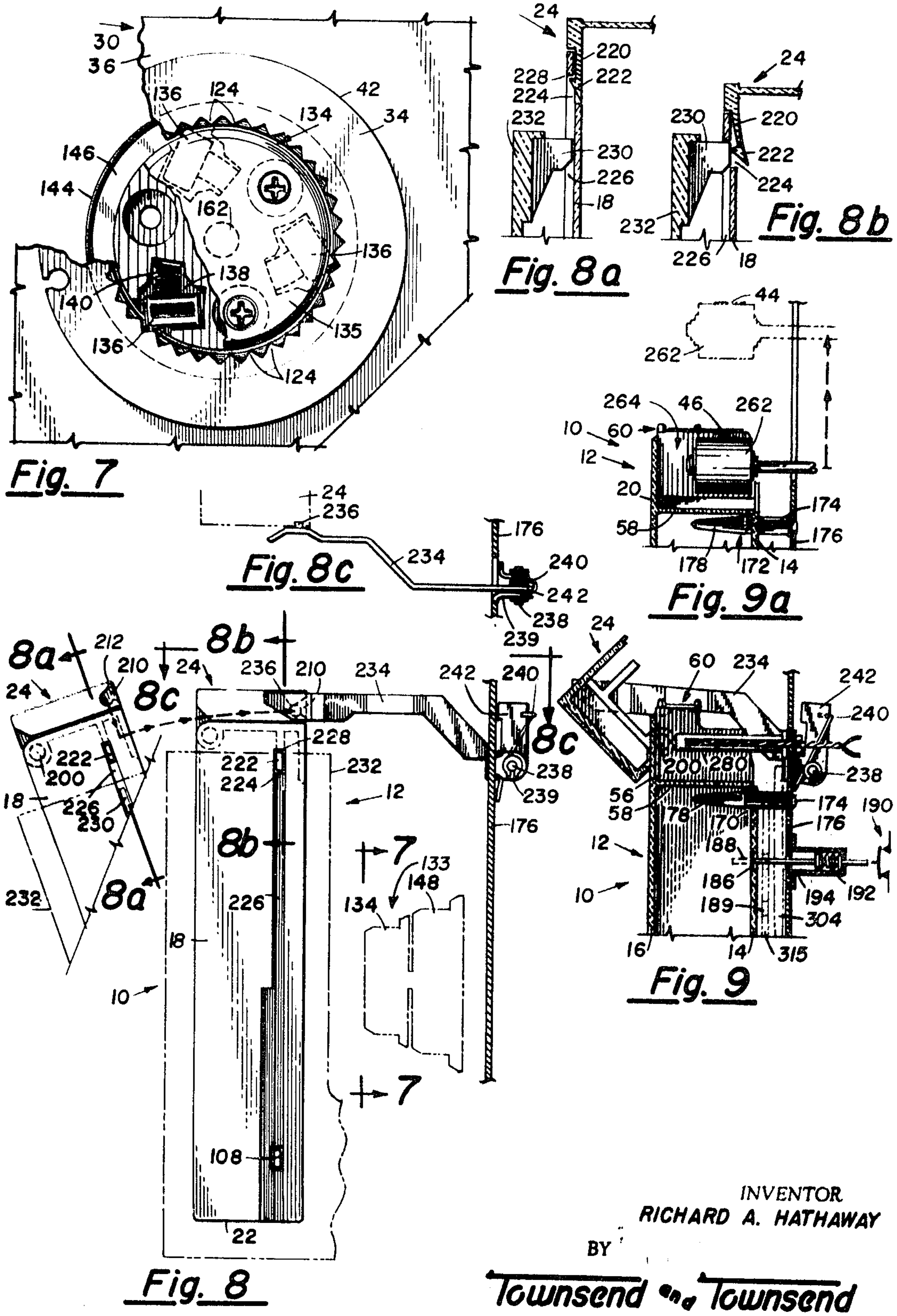
Figures 10, 10A:
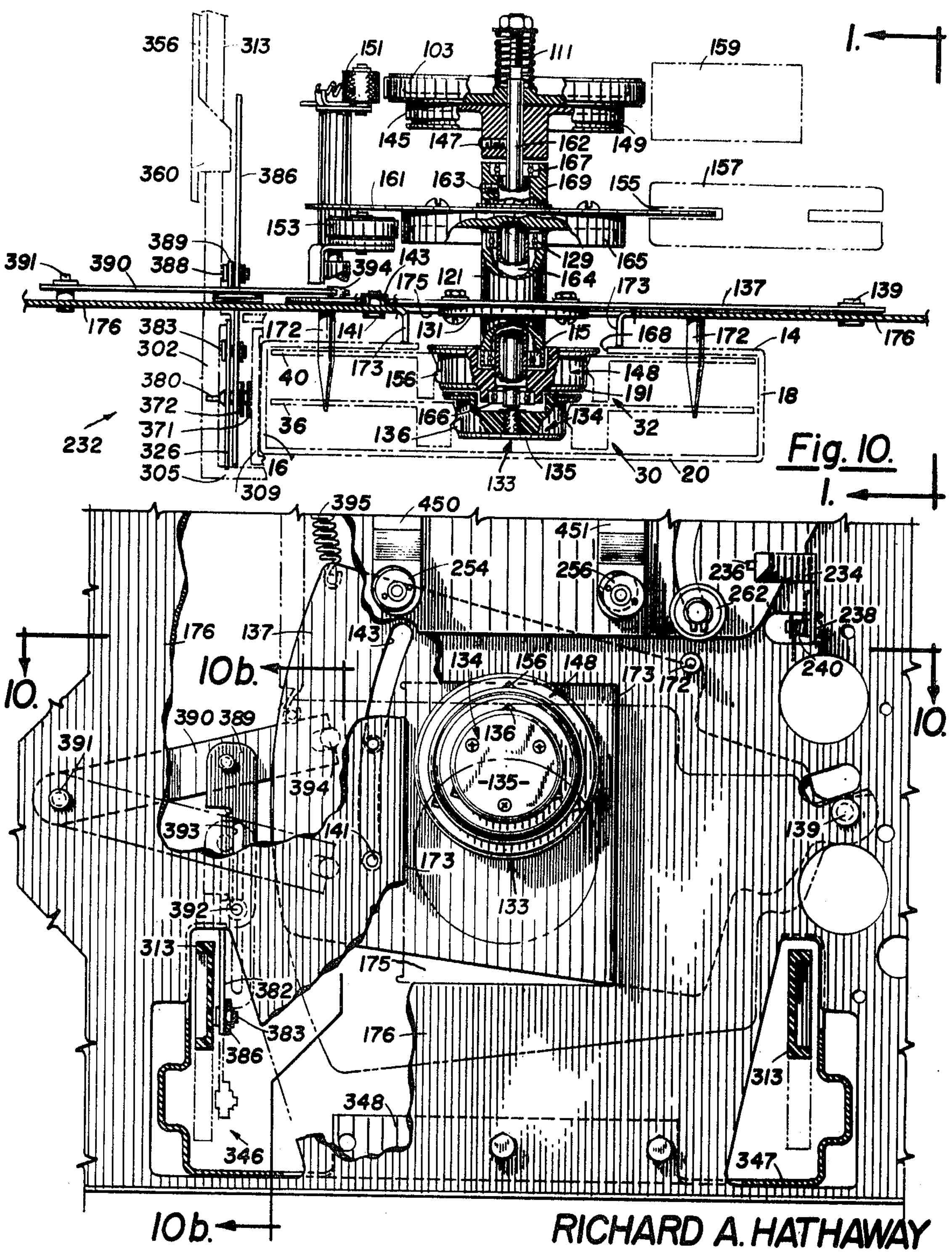
Figures 10B, 10C, 11, 12:
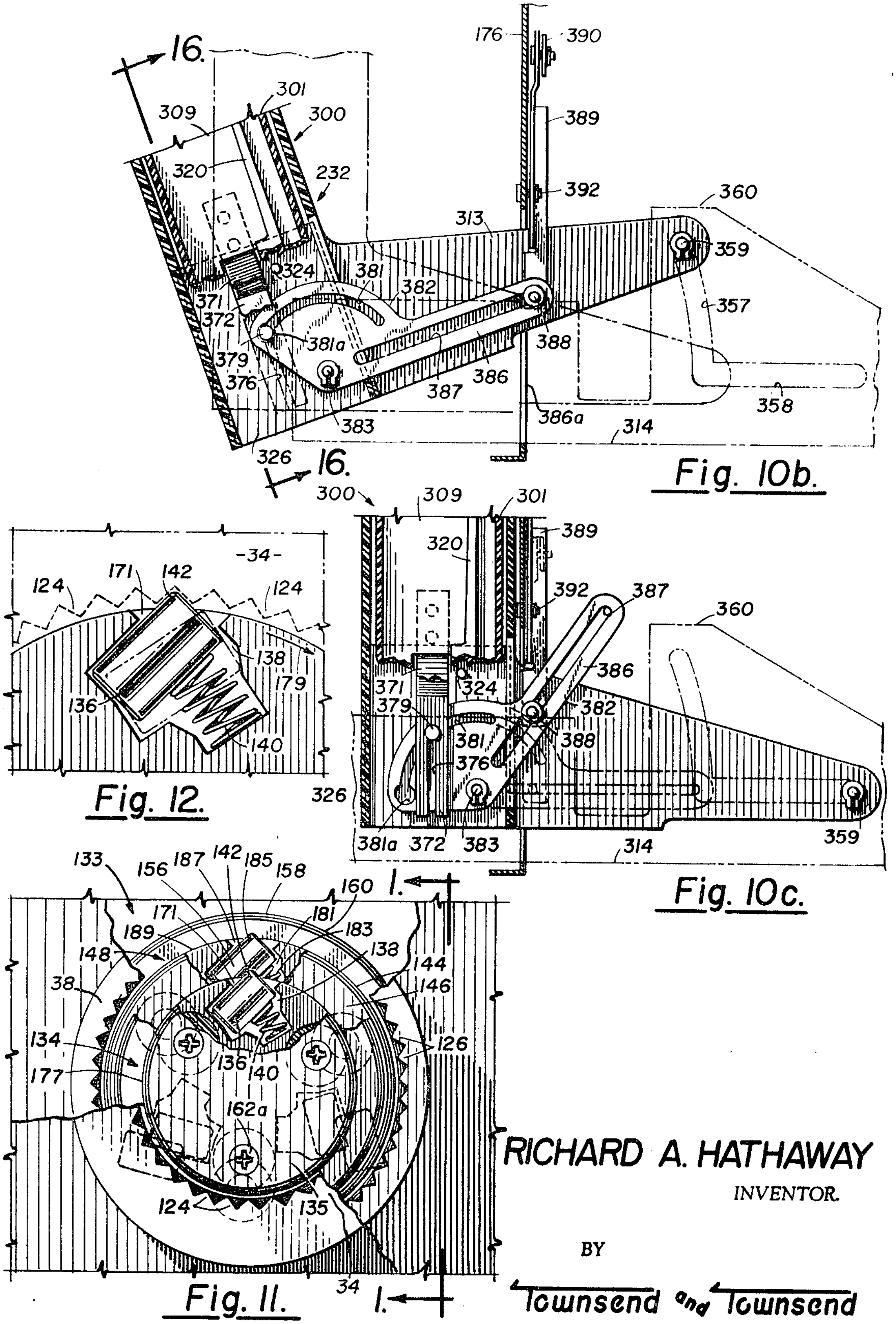
Figures 13, 23:
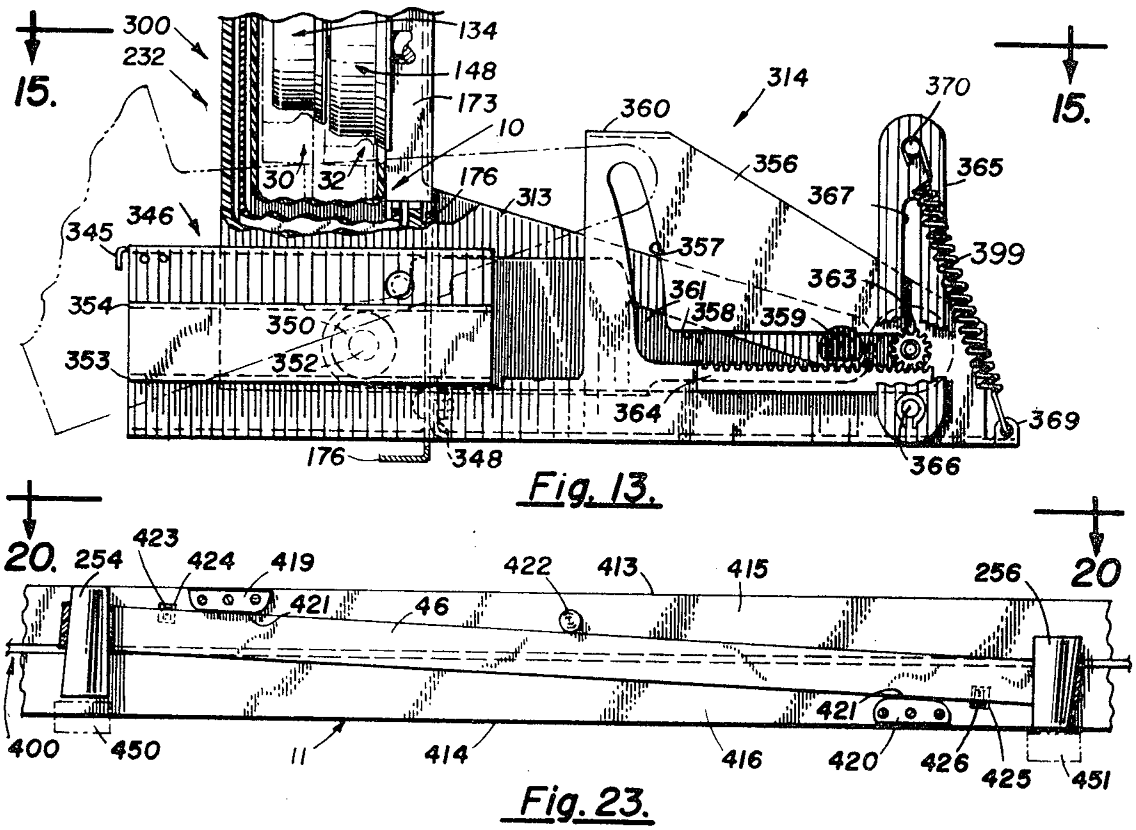
Figure 24:
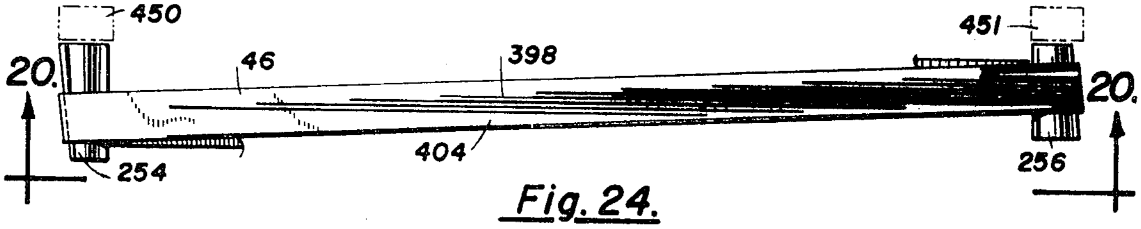
Figures 14, 14A, 14B, 15:
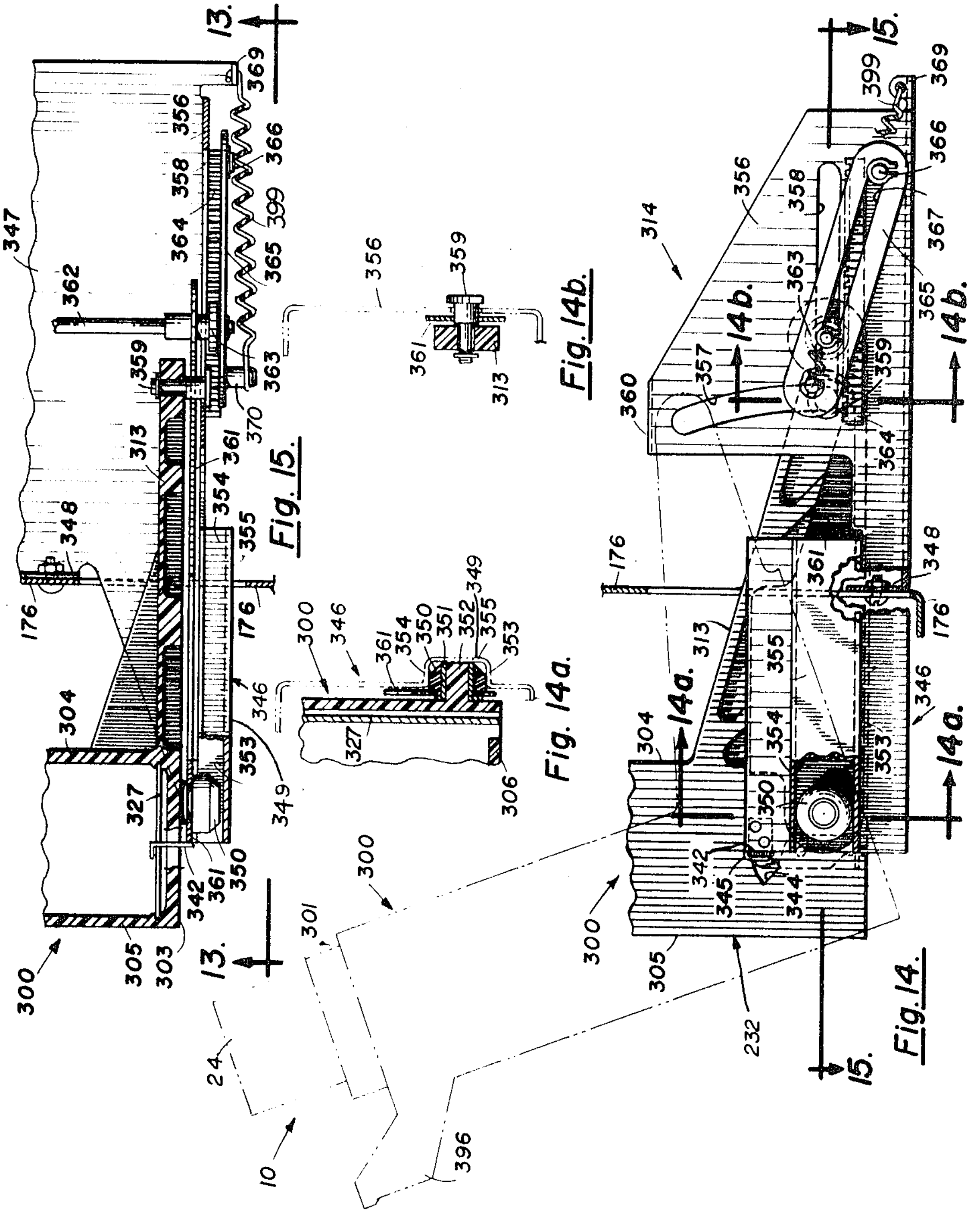
Figures 16, 17, 18, 19:
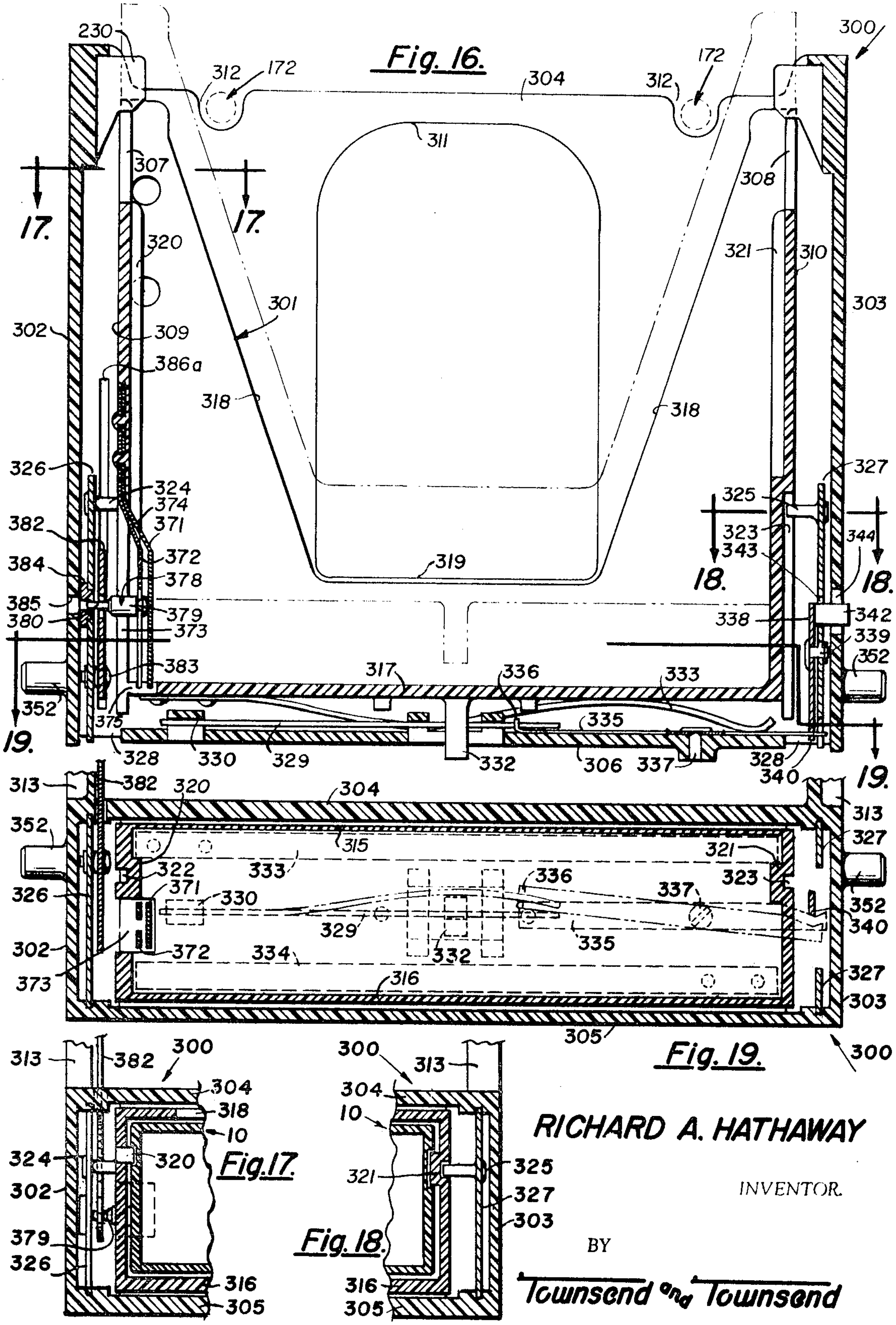
Figure 20:
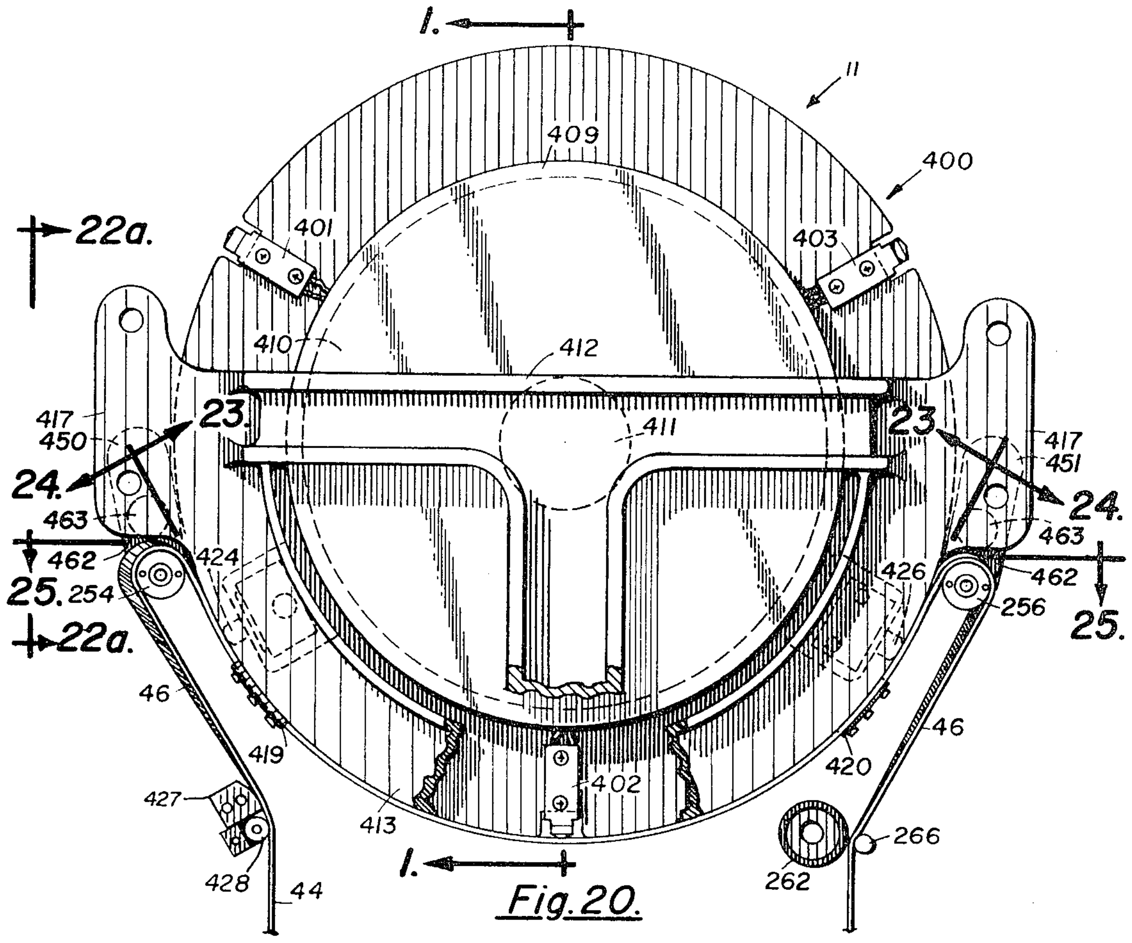
Figure 22A:
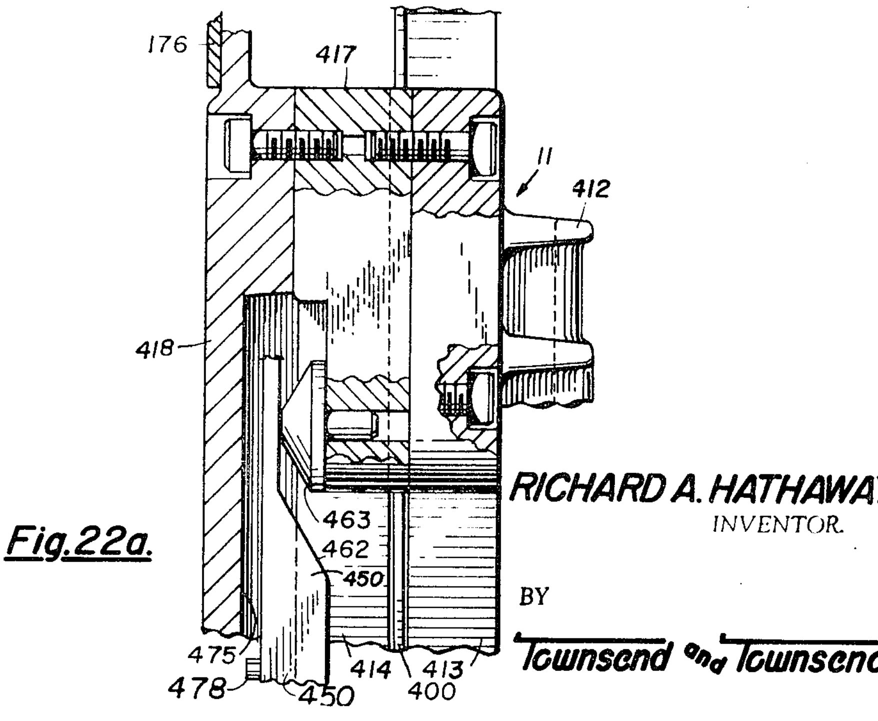
Figure 21:
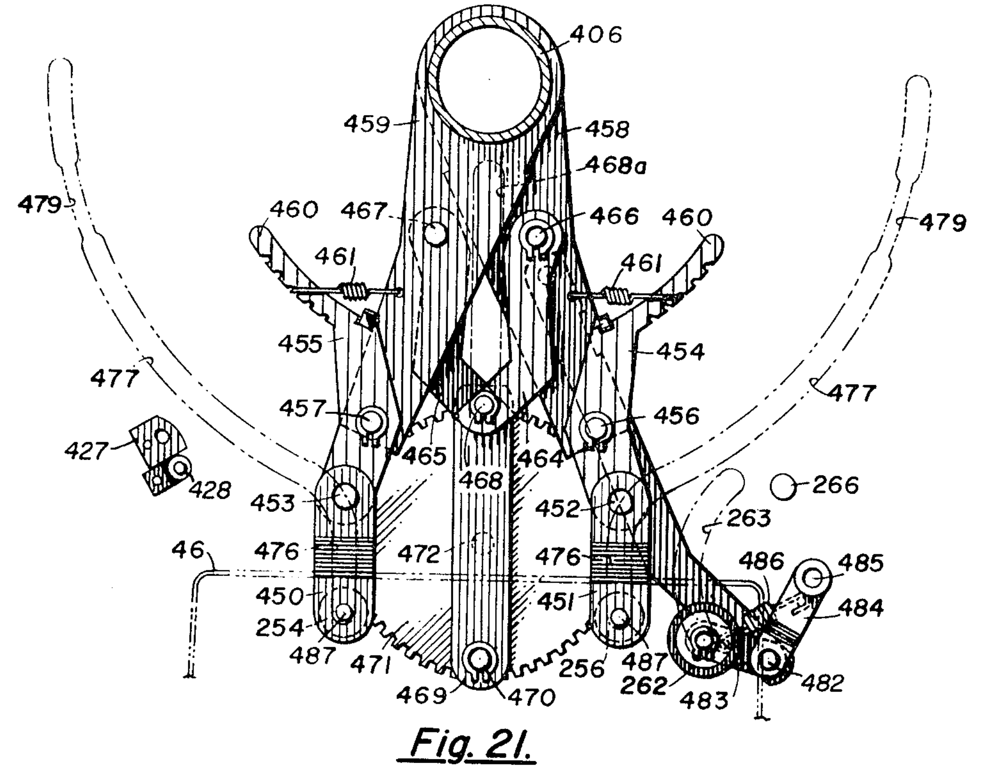
Figure 22:
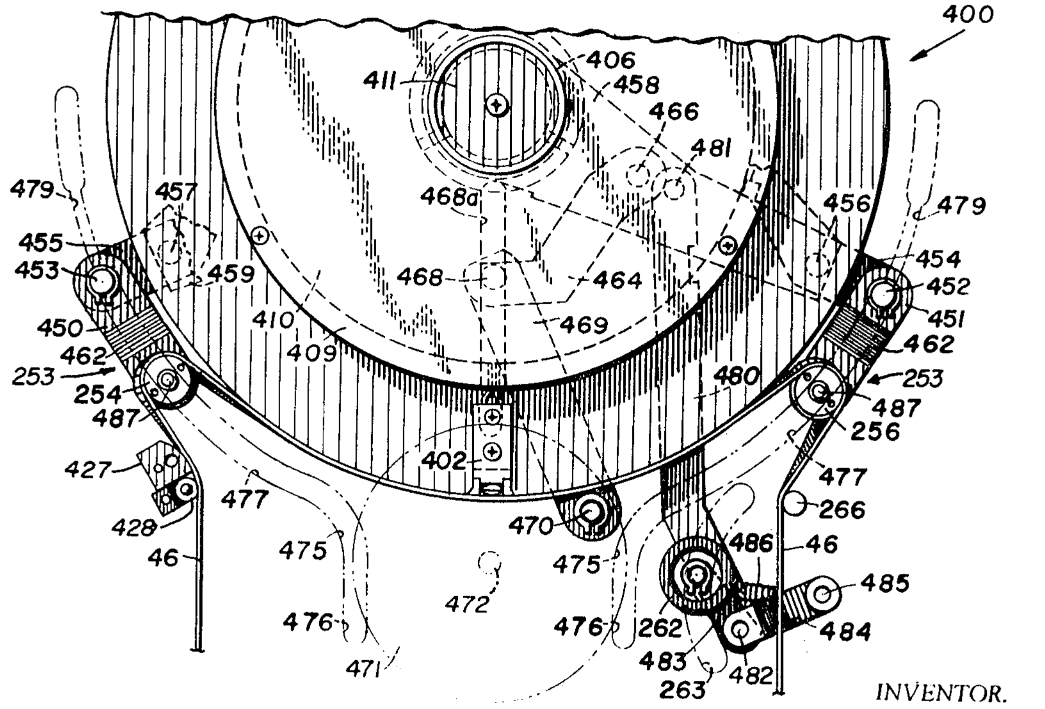

FIG. 4*a* is a perspective view of the bearing component utilized in the tape guides of FIG. 3;

FIG. 5 is a top plan view taken along line 5—5 of FIG. 3;

FIG. 6 is a cross-sectional view taken along line 6—6 of FIG. 3;

FIG. 7 is an end elevational view of a spindle of the apparatus;

FIG. 8 is a side elevational view of the cartridge before being moved into an operative position near the base plate of the apparatus;

FIGS. 8*a* and 8*b* are cross-sectional views taken along lines 8*a*—8*a* and 8*b*—8*b*, respectively, of FIG. 8;

FIG. 8*c* is a top plan view taken along line 8*c*—8*c* of FIG. 8;

FIG. 9 is a fragmentary, cross-sectional view of the cartridge, as taken along section line 9—9 of FIG. 3;

FIG. 9*a* is a view similar to FIG. 9, but showing a different view of the cartridge, as taken along section line 9*a*—9*a* of FIG. 3;

FIG. 10 is a top plan view, partly in section, showing the cartridge in operative position as fitted on the spindle structure;

FIG. 10*a* is a front elevational view of the spindle structure, looking toward the base plate, in the position that the parts assume before the cartridge is placed in the bucket and that they maintain if the cartridge is small;

FIG. 10*b* is a side elevational view of the linkage for shifting the spindle structure;

FIG. 10*c* is a view similar to FIG. 10*b* but showing another position of the linkage, which the parts of the linkage assume after placing a small size cartridge in operating position;

FIG. 11 is a view similar to FIG. 7 but on an enlarged scale;

FIG. 12 is an enlarged, elevational view of the detent of one of the spindles;

FIG. 13 is a side elevational view of the mount for the carriage mechanism, the carriage mechanism being in the position assumed when the cartridge is in its operating position;

FIG. 14 is a view similar to FIG. 13 but showing the carriage mechanism in the position which it assumes when ready to accept a cartridge;

FIGS. 14*a* and 14*b* are cross-sectional views taken along lines 14*a*—14*a* and 14*b*—14*b*, respectively, of FIG. 14;

FIG. 15 is a horizontal cross section of the mount of FIG. 14;

FIG. 16 is a vertical cross section of the carriage mechanism;

FIGS. 17, 18 and 19 are cross sectional views taken along lines 17—17, 18—18 and 19—19 of FIG. 16;

FIG. 20 is a front elevational view of the rotary head assembly;

FIG. 21 is a front elevational view of the guide drive means;

FIG. 22 is a view similar to FIG. 21 but showing the rotary head assembly in positional relation to the guide drive means;

FIG. 22*a* is a side elevational view, partly in section, of the guide drive means;

FIG. 23 is a bottom plan view of the rotary head assembly flattened out;

FIG. 24 is a top plan view of the tape flattened out; and

Figure 25:
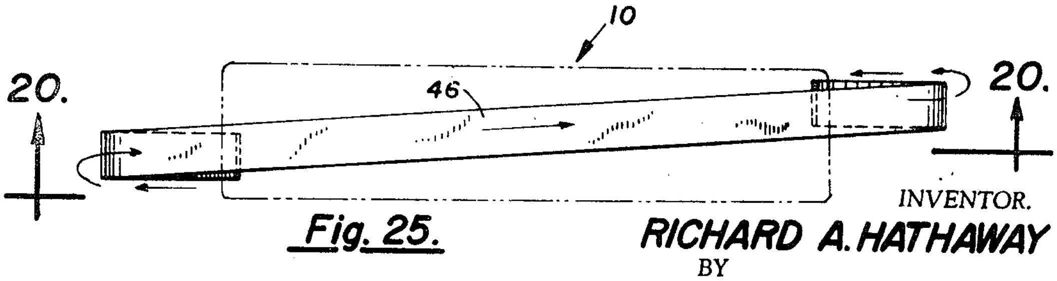

FIG. 25 is a top plan view of the cartridge.

The present invention is directed to a tape transport apparatus broadly denoted by the numeral 8 and is adapted to be utilized with a reel-over-reel tape cartridge 10 (FIGS. 2 and 2*a*) which contains a flexible magnetic tape. Apparatus 8 includes a vertical base plate 176 (FIGS. 1, 8, 9, 9*a*, 10, 10*a*, 10*b*, 14 and 22*a*) on which is mounted a rotary head assembly 11 (FIG. 22) against a portion of which a flexible magnetic tape is to be disposed for scanning thereof by the heads of the assembly, a carriage mechanism 232 (FIGS. 8, 8*a*, 8*b*, 10*b*, 13 and 14) which receives cartridge 10 and moves the same toward and away from base plate 176, a spindle structure 133 (FIGS. 1, 7, 8, 10 and 11) carried on base plate 176 onto which the tape reels of cartridge 10 are moved when carriage mechanism 232 moves the cartridge from a retracted position spaced (FIGS. 10*b*, 14 and 14*a*) from base plate 176 to an operative position adjacent thereto (e.g. FIG. 13), and a tape guide system 253 (FIGS. 5 and 22) including tape pick-up elements 254 and 256 shiftably carried by the base plate and operable to move a stretch of the tape out of the cartridge and about a portion of the arcuate path of travel of the heads of rotary head assembly 11. Assembly 11 is also referred to as a "-Multiple rotary transducer assembly." While the foregoing main elements of apparatus 8 can be oriented in any desired way, they will be described herein as being oriented in a manner such that base plate 176 is generally vertical, carriage mechanism 232 is movable laterally of and toward and away from one side of base plate 176, spindle structure 133 is rotatable about a generally horizontal axis, rotary head assembly 11 is rotatable about a generally horizontal axis and disposed above the operative position of cartridge 10, and tape guide system 253 is movable in a generally vertical plane as it moves the tape stretch out of cartridge 10 toward rotary head assembly 11.

GENERAL OPERATION

With carriage mechanism 232 spaced laterally from base plate 176, a cartridge is inserted into the carriage mechanism and the latter is moved toward the base plate to, in turn, advance the cartridge into its operative position beneath rotary head assembly 11. During this movement, the tape reels of the cartridge are moved onto respective spindles of spindle structure 133 and the cartridge receives a pair of spaced tape guides of tape guide system 253. The tape guides then urge a stretch of the magnetic tape in the cartridge upwardly and about a portion of the arcuate path of travel of the heads of rotary head assembly 11.

For a record or playback operation, the heads are rotated to scan the tape and a capstan is operated to advance the tape past the rotary head assembly as one of the spindles rotates the take-up reel to cause tape to be wrapped thereon. After the record or playback operation, the tape guides are moved downwardly toward the cartridge to permit the return of the tape stretch thereto. The carriage mechanism can then be pulled away from the base plate so that the cartridge can be removed therefrom. Before this last step, the tape can be rewound onto the supply reel in the cartridge by rotating the other spindle. Provision is made to advance the tape in a fast-forward mode while the tape reels are coupled to their spindles and when the tape stretch is in the cartridge.

The tape guides present the tape stretch to the path of the heads at a helix angle. Thus, the heads can scan the tape along oblique tracks. Also, the heads are axially staggered, i.e., in generally parallel planes relative to each other, so that the skip-field principle can be utilized with apparatus 8 to conserve tape.

CARTRIDGE 10

The tape cartridge includes a housing 12 provided with a front wall 14 (FIGS. 2 and 6), a pair of sidewalls 16 and 18 (FIGS. 2 and 2a), a back wall 20 (FIG. 3), a bottom wall 22 (FIG. 6), and a hinged closure or cover 24 pivotally secured to sidewalls 16 and 18. Housing 12 is preferably of a two-piece construction. To this end, front wall 14, sidewalls 16 and 18, and bottom wall 22 are integral with each other to form a one-piece unit. Back wall 20 is releasably secured to this unit by attachment screws 26 (FIGS. 2a and 3) which extend through holes in back wall 20 and are threaded into tubular projections 28 (FIG. 3) which are integral with the inner surface of front wall 14. The unit formed by the front, side and bottom walls is preferably molded from a suitable plastic material. Also, back wall 20 can be molded from plastic. As hereinafter described, a number of webs and other projections are molded with the housing unit comprised of the front, side and bottom walls. This simplifies the formation of the unit and reduces its production costs.

Cartridge 10 has a pair of generally axially aligned tape reels 30 and 32 (FIG. 6) therewithin, the reels being unsupported in the cartridge in the sense that they can "float" or move about randomly to a limited extent with respect to each other and with respect to housing 12. The reels are allowed to be loose because, when the cartridge is in an operative position beneath rotary head assembly 11, the reels will be securely attached to respective spindles of spindle structure 133 (FIGS. 1 and 6) and it is the spindles that will support the reels and determine their operative positions with respect to the rotary head assembly of the tape transport. In their operative positions, the reels will be truly co-axial with each other and will be spaced inwardly from the inner surfaces of housing 12 so as to be free to rotate with their spindles without interfering with each other and without interference with any part of the cartridge housing itself.

Reel 30 (FIG. 6) is provided with a hub 34 and a flange 36 which extends radially outwardly from hub 34. Similarly, reel 32 is provided with a hub 38 and a flange 40. Reel 30 defines the tape supply means for the cartridge and reel 32 provides the tape take-up means therefor. Each of the hubs has a circular outer face 42 about which a flexible, magnetic tape 44 (FIG. 4) is to be wrapped, the adjacent flange providing the lateral support for the tape pack formed on the corresponding hub. The tape pack on supply reel 30 is denoted by the numeral 48 and is shown in FIG. 4 before tape is moved onto reel 32.

Tape 44 (FIG. 3) is coupled in any suitable manner to hubs 34 and 38 and has a tape stretch 46 (FIG. 5) extending between the reels. Preferably, each end of the tape has a transparent leader whose outer end is connected to a respective hub. The transparency of the leaders allows them to be optically sensed as the tape moves between the reels.

The path along which the tape traverses as it moves between the reels is shown in FIG. 3 wherein the tape moves off hub 34 of reel 30, past a first tape guide 52, upwardly through an opening 54 between sidewall 16 and the adjacent web segment 56 see also (FIG. 9) of a web broadly denoted by the numeral 58. The tape then passes over a second guide 60 (FIGS. 2 and 3), over another web segment 62 (FIG. 3), across the flat surface 64 of a hollow extension 66 integral with web 58, across a third web segment 68 and over a third tape guide 70. The tape then passes back into the cartridge through an opening 72 (FIGS. 3 and 5), past a fourth tape guide 74 and then onto hub 38 of the take-up reel 32. For purposes of illustration, FIG. 3 shows the tape in full lines as it appears on the supply reel 30 at the beginning of a record or playback operation when the maximum amount of tape is on the supply reel. FIG. 3 also shows in dashed lines the position of the tape on the supply reel when the take-up reel has the maximum amount of tape, i.e., corresponding to the end of a record or playback condition. Tape reel 30 and hub 34 rotate in a counterclockwise sense and tape reel 32 and hub 38 rotate in a clockwise sense during a record or play back operation. Conversely, tape reel 30 rotates in a clockwise sense and tape reel 32 rotates in a counterclockwise sense during a rewind operation.

Web 58 is integral with the uppermost, arcuate extremity of front wall 14 and projects laterally therefrom; hence, the web can be molded with the housing unit comprised of the front, side and bottom walls. Web segments 56, 62, 68 and 71 and hollow extension 66 all form parts of web 58.

Each of the tape guides 52, 60, 70 and 74 includes a flanged, metallic bearing 76 of the type shown in FIG. 4a wherein a semi-cylindrical surface 78 is bounded at the opposed ends by a pair of flanges 80. The bearing has a pair of inwardly extending projections 82 spanning the distance between flanges 80 and these projections snap around the adjacent flat surfaces of a respective boss 84 integral with web 58 in the manner shown in FIG. 3. The various bosses 84 are at least as long as and are complementally received within respective bearings 76. Bosses 84 of tape guides 52 and 74 are integral with the inner surface of front wall 14; whereas, bosses 84 of tape guides 60 and 70 are integral with portions of the outermost extremities of web segments 56 and 71. Moreover, the last mentioned pair of bosses 84 are generally parallel with each other but are canted with respect to the planes of their respective web segments 56 and 71, whereby tape stretch 46 supported by guides 60 and 70 will extend diagonally across the open extremity of the cartridge housing as shown in FIG. 5. Also, tape stretch 46 is supported by and movable over the upper end faces of web segments 62 and 68 and the upper flat face 64 of hollow extension 66.

A pair of arcuate webs 86 (FIG. 3) are formed with the front, side and bottom walls of housing 12 and cooperate with web 58 to strengthen these walls while permitting rotation of reels 30 and 32 within the cartridge housing. The right-hand web 86 does not extend to rear wall 20 so as to accommodate a tape indicator arm to be described. Web segments 88 interconnect the adjacent tubular projections 28 to bottom wall 22 and to the adjacent arcuate web 86 to strengthen the projections. Similar web segments extend to the upper projections 28 and to bosses 84 of tape guides 52 and 74 to strengthen the same, as shown in FIG. 3.

Brake means in housing 12 operates to releasably hold the reels against movement when the cartridge is out of an operative position with respect to a tape transport. To this end, a brake unit 90 is pivotally mounted within the housing and has a pair of generally parallel, finger-like extensions 92 and 94 (FIGS. 3 and 4) of substantially equal length which releasably engage corresponding, spaced teeth 96 on the outer peripheries of respective flanges 36 and 40. Extensions 92 and 94 are integral with a second extension 98 having a sleeve 100 at one end thereof, the sleeve being pivotally mounted on a pin 102 integral with front wall 14 and disposed adjacent to the junction of sidewall 18 and bottom wall 22 (FIG. 3). Extensions 92 and 94 are essentially independent of each other in the sense that they are spaced apart as shown in FIG. 4. A spring 104 integral with extension 98 projects outwardly therefrom at an angle with respect to extensions 92 and 94. Spring 104 has a rib 105 on its outer end which engages a boss 107 integral with the adjacent arcuate web 86. Thus, boss 107 serves as an abutment against which spring 104 engages, allowing the spring to flex in the manner shown in full lines in FIG. 3 when sleeve 100 is rotated in a counterclockwise sense. Thus, extensions 92 and 94 can then move downwardly and out of engagement with teeth 96 on flanges 36 and 40, thereby releasing the reels for rotation within the housing.

To cause movement of extensions 92 and 94 into the full line positions of FIG. 3, an arm 106 is provided, the arm being integral with sleeve 100 and extending upwardly therefrom. Arm 106 has a lateral projection 108 which normally projects through an opening 110 in sidewall 18. This projection is above pin 102 so that, when a lateral force is exerted on the projection, arm 106 is forced in a counterclockwise sense about pin 102 when viewing FIG. 3. This movement is against the bias force of spring 104 which flexes from the dashed line position to the full line position to, in turn, allow movement of extensions 92 and 94 with sleeve 100 from the dashed line position to the full line position of FIG. 3, thereby out of coupled relationship with the teeth on the reel flanges. That is to say, guide bar 321 (FIG. 16) enters slot 226 (FIG. 2) as the cartridge 10 (FIG. 3) is inserted into bucket 300, thereby forcing projection 108 and arm 106 counterclockwise.

It has been seen that projection 108 is adapted to be forced inwardly of the housing when the cartridge is moved into an operative position within a carriage mechanism which is adapted to move the cartridge toward a tape transport. So long as the cartridge remains in the operative position in the carriage mechanism, projection 108 will be held inwardly and extensions 92 and 94 will be held out of coupled relationship with the reel flanges. Removing the cartridge from the carriage mechanism causes the projection to return into opening 110 as shown by the dashed line of FIG. 3.

A tape indicator arm 112 is provided to indicate the amount of tape left on supply reel 30 or the playing time remaining during a record or playback operation. This arm, shown in FIG. 3, has a lateral extension 114 at one end thereof. A sleeve 116 on extension 114 is pivotally mounted on a pin 118 integral with front wall 14 near the junction between sidewall 16 and bottom wall 22. A coil spring 119 surrounding pin 118 is coupled with extension 114 and biases arm 112 in a counterclockwise sense when viewing FIG. 3; thus, arm 112 is held in engagement with the tape and follows the decrease of diameter of the tape pack as the tape is fed off the supply reel and onto the take-up reel.

Figure 2:
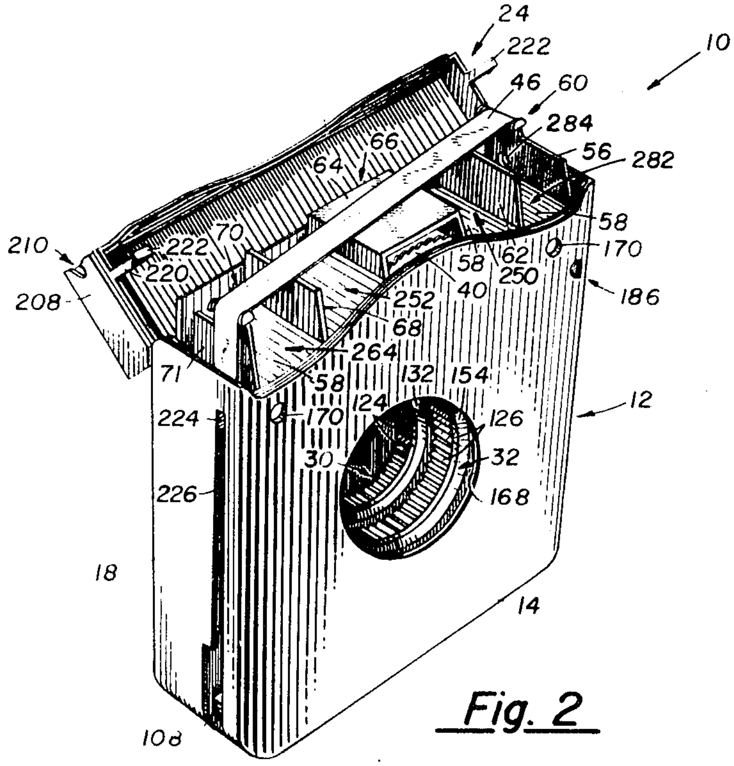

Arm 112 has an arcuate extension 120 at the opposite end thereof which extends across a vertical slot 122 formed in back wall 20 FIGS. 2 and 3). The configuration of extension 120 is such that, regardless of the diameter of the tape pack on the supply reel, the portion of extension 120 visible through slot 122 will be substantially horizontal.

A scale can be secured to the outer surface of rear wall 20 on one side of slot 122 and the scale can be calibrated in terms of minutes of tape playing time remaining or having elapsed and extension 120 will be alignable with this scale for substantially all tape pack diameters on supply reel 30.

Front wall 14 is provided with a pair of spaced holes 170 therethrough (FIG. 2) for receiving respective alignment pins 172 (FIG. 1*a*) carried by and projecting laterally from base plate 176. One of these holes in the cartridge is elongated or elliptical as shown in FIG. 3 to provide for tolerances. FIGS. 9, 9*a* and 10 show that each pin 172 has a cylindrical portion 174 which is rigidly secured in any suitable manner to the base plate 176 of the tape transport. The opposite end of the pin has a conical portion 178 which is receivable within a corresponding hole 170 in cartridge wall 14. These guide pins are also received in openings 312 (FIG. 16) in wall 304 between wall 14 and base plate 176, wall 304 forming a part of the bucket in the carriage mechanism.

A pair of spaced, rigid extensions 173 (FIGS. 10 and 10*a*) are secured to the base plate on opposite sides of a rectangular opening 175 therethrough. These extensions abut front wall 14 of the cartridge when the latter is in its operative position to properly position cartridge housing 12 with respect to the base plate.

Front wall 14 may also be provided with a knock-out tab 186 to indicate whether or not the tape has been prerecorded. To this end, front wall 14 may be provided with an arcuate slot 184 (FIG. 3) which defines tab 186 and the tab can be knocked out or removed from wall 14 by a suitable tool. When the tab is removed, the resulting hole can receive a shiftable pin 188 projecting outwardly from base plate 176 and movable relative thereto. The pin will abut tab 186 if the latter remains on front wall 14, as shown in FIG. 9, so that the pin will be shifted to the right when viewing FIG. 9 to close a normally open switch 190 forming a part of a circuit adapted to enable a recording circuit. Pin 188 is biased to the left in FIG. 9 in any suitable manner, such as by a coil spring 192 disposed within a tubular housing 194 secured to the proximal face of base plate 176. Walls 304 and 315 of the carriage mechanism are also provided with openings through which pin 188 can extend.

If the tape is prerecorded, tab 186 is removed so that the pin will be received within the corresponding opening as shown in dashed lines in FIG. 9 to thereby prevent movement of the pin to the right. Thus, switch 190 remains open and the recording circuit cannot be enabled.

Top 24 (FIGS. 2, 2*a*, 8*a*, 8*b*, 8*c* and 9) is pivotally secured by a pair of pins 200 to the upper, rear extensions of sidewalls 16 and 18. The inner ends of pins 200 are anchored in a suitable web 202 (FIG. 2*a*), there being a slot 204 underlying each pin 200, respectively, to allow the hinge part 206 on top 24 which receives the adjacent pin to move downwardly without binding as top 24 is opened.

The top has a pair of opposed side faces 208 (FIG. 2), each side face being provided with a pin-receiving notch or groove 210 extending downwardly and rearwardly from the front face of the top as shown in FIG. 6. To this end, each groove 210 has an upper, inclined surface 212, an inner end surface 214, and a pair of relatively convergent, lower inclined surfaces 216 and 218. The purpose of grooves 210 is to receive laterally extending pins on respective arms 234 (FIG. 8 and 9) pivotally mounted on and projecting outwardly from base plate 176.

The top is opened by the pins on arms 234 when housing 12 is moved toward base plate 176. To this end, the pins on the arms are received within grooves 210 and force the top rearwardly and about pins 200 since the axes of the latter are below the inner end of groove 210. The top is then pivoted to the dashed line position of FIG. 6, thus exposing tape stretch 46.

Latch means is provided for releasably locking top 24 to housing 12 so long as the cartridge is not fully received within the carriage mechanism. To this end, each side of top 24 is provided with a resilient leg 220 (FIGS. 2 and 6) which depends from top 24 and has a wedge-shaped latch formation 222 as shown in FIGS. 8*a* and 8*b*. Each latch formation 222 normally projects into the adjacent sidewall opening 224 communicating with a groove 226 (FIGS. 2 and 2*a*) in the outer surface of the adjacent sidewall, there being a groove 226 for each sidewall, respectively. Grooves 226 are adjacent to front wall 14 so as to be asymmetrically located between front and back walls 14 and 20. Also, each groove 226 has a step intermediate its ends so that its lower portion is wider than its upper portion. Also opening 110 (FIG. 3) for brake unit 90 communicates with groove 226 of sidewall 18.

Figure 1:
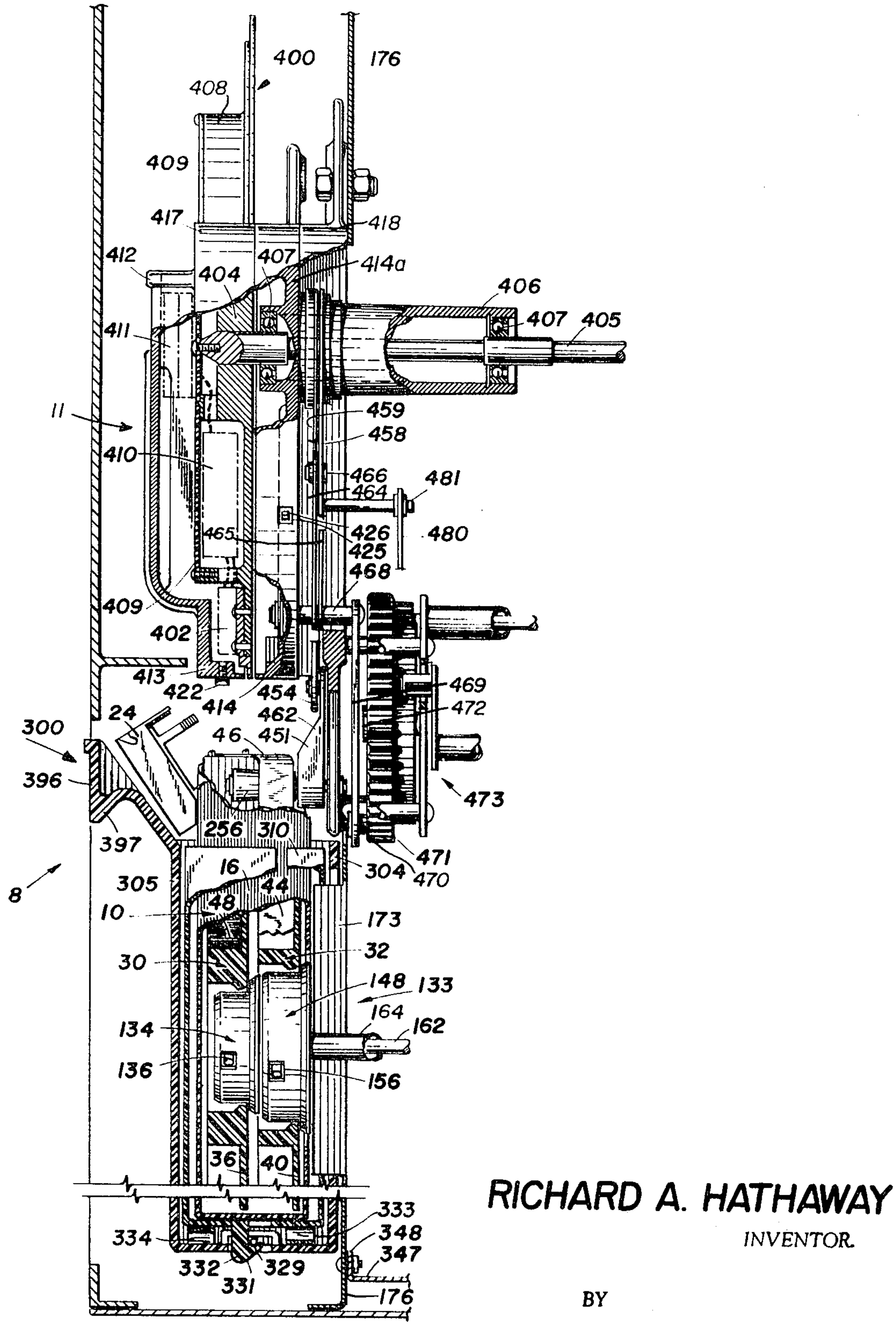
Figure 2A:
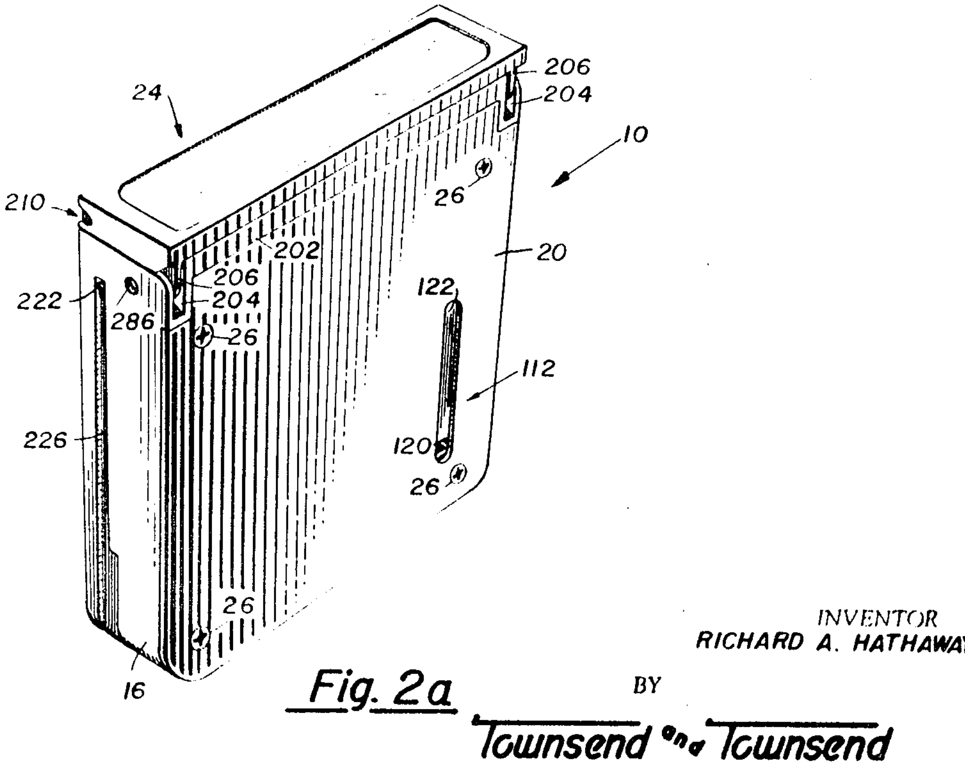

The wedge shape of the latch members causes the latter to latch under the shoulder 228 defining the upper extremity of opening 224 so that the top cannot normally be opened to expose tape stretch 46. However, if the latch members are forced inwardly, such as by a spline 230 (FIGS. 8, 8*a*, 8*b* and 16) on the carriage mechanism 232 which moves the cartridge toward the base plate, the latch member is moved inwardly of shoulder 228 and permits opening of top 24. Spline 230 moves in and is guided by groove 226 as cartridge 10 is inserted in mechanism 232. The carriage mechanism can then advance the cartridge toward base plate 176 so that a pair of the aforementioned arms 234 will operate to open top or cover 24 in the manner shown in FIGS. 8 and 9 as the cartridge is moved toward base plate 176 (FIGS. 1 and 13).

Each arm 234 is preferably of the shape shown in FIG. 8*c* and extends through an adjacent opening in base plate 176 and is pivotally carried thereon by a pin 238. A coil spring 240 on pin 238 engages the arm and biases it in a counterclockwise sense when viewing FIG. 8. A stop 242 rigid to arm 234 near pin 238 engages the adjacent side of the base plate and limits the counterclockwise travel of the arm. Since pins 236 and the groove 210 are above pivot pin 200, arm 234 will open top 24 as the cartridge is advanced by carriage mechanism 232 toward base plate 176.

Cartridge 10 is of the type which is adapted to be used with a rotary head assembly on a tape transport wherein tape stretch 46 is pulled outwardly of the cartridge and disposed partially about a rotary scanner of the type having a number of spaced heads rotatable about a central axis, the heads being angularly spaced apart and in generally parallel planes to permit the tape transport and the cartridge to utilize the advantages of the skip-field principle by means of which selected video fields of a video image are recorded on the tape by one of the heads. In a playback mode, all of the heads scan the same track for each revolution of the scanner so that the recorded information is played back a number of times at a rate above the flicker rate of the human eye to present a picture of acceptable quality.

The normal operative position of cartridge 10 is below rotary head assembly 11. The stretch of tape 46 is then in proximity to the top of the cartridge and perpendicular to the base plate. The cartridge is adapted to cooperate with a pair of shiftable tape guides 254 and 256 shown schematically in dashed lines in FIG. 3 and forming parts of tape guide system 253. Guides 254 and 256 move upwardly and, in so doing, pull the tape away from the cartridge and about a portion of the arcuate path of each head of the rotary head assembly. Housing 12 has a pair of recesses 250 and 252 for receiving guides 254 and 256 as the cartridge moves toward the base plate (FIGS. 1 and 13). Recess 252 is disposed between web segment 68 and hollow extension 66; whereas, recess 250 is disposed between web segment 62 and extension 66 (FIG. 3).

A pinch roller 262 is also shiftably carried by base plate 176 and is received in cartridge 10 within a recess 264 (FIG. 1). The shaft of pinch roller 262 extends through a slot 263 (FIG. 22) in the base plate 176 and is moved by structure hereinafter described toward a rotatable tape drive capstan 266 extending outwardly from the base plate and having a motor (not shown) for driving the same at a predetermined speed. The pinch roller operates to force the tape into engagement with the capstan so that the latter will drive the tape toward take-up reel 32 during a record or playback mode.

To sense the end of the tape play, a photocell device 280, extending outwardly from base plate 176 (FIG. 9) extends into a recess 282 defined by web segments 56 and 62 (FIG. 3). The photocell is aligned with an opening 284 in web segment 56 and opening 286 in the adjacent sidewall 16 so that a light source 288 carried by the base plate can direct a light beam toward the photocell. When the transparent leader at the end of the tape connected to hub 34 passes between the photocell and the light source at the end of a record or playback operation, a signal is generated in the photocell and such signal can be used to cause automatic operation of a number of elements, such as the mechanism which effects the return of tape guides 254 and 256 and pinch roller 262 to their initial positions shown in FIG. 3. Thus, the tape can be returned to the cartridge from the rotary head assembly and a rewind operation can then be commenced.

For rewinding the tape, the tape stretch 46 must be in the position shown in FIG. 3. Suitable means can be provided to assure that there will be no rewind of the tape until this condition is satisfied. Thereupon, supply reel 30 (with hub 34) is rotated in a clockwise sense to wind tape thereon, take-up reel 32 rotating freely in a counterclockwise sense during the rewind operation.

During a rewind operation, photocell 280 will sense the presence of the transparent leader secured to hub 38 so as to generate a signal which can be used to stop the rewind operation. Also, during rewind, the tape pack diameter on hub 34 will progressively increase to, in turn, cause indicator arm 112 to move downwardly past slot 122 and in a clockwise sense when viewing FIG. 3. At the end of the rewind operation, extension 120 of arm 112 will again indicate the maximum play condition of the tape wherein extension 120 will be adjacent to the bottom of slot 122.

After a rewind operation, the carriage mechanism can be moved away from base plate 176 so that the cartridge can be separated therefrom. When this occurs, top 24 is moved into its closed position since pins 236 on arms 234 remain in grooves 210 during the movement of mechanism 232 away from the base plate. When the cartridge is in the full line position of FIG. 8, it can be moved further away from arms 234 and out of coupled relationship to pins 236. For instance, the carriage mechanism can be tilted with respect to the base plate to allow access to the cartridge.

As the cartridge is moved away from the carriage mechanism, splines 230 move out of engagement with latch-defining tips 222 on legs 220 of top 24. This allows the tips to move back into openings 224 (FIGS. 8*a* and 8*b*) to releasably lock the top to housing 12. Also, projection 108 on brake 90 (FIG. 3) moves out of engagement with the guide bar 321 (FIG. 16) which forces it inwardly of housing 12, whereupon, extensions 92 and 94 return to their dashed line positions of FIG. 3 under the influence of spring 104. The extensions then engage the teeth on respective reel flanges to releasably lock the reels against movement within the cartridge housing.

SPINDLE STRUCTURE 133

This structure includes a pair of spindles, one of the spindles (FIGS. 6 and 10) having a rotor 134 secured to one end of a shaft 162 and the other spindle having a rotor 148 secured to the end of a shaft 164 near rotor 134. Shaft 164 is tubular and receives shaft 162, the shafts being concentric and rotatable relative to each other. The shafts extending through opening 175 (FIG. 10) in the base plate are carried within an arbor 121 having spaced bearings 115 and 129 for rotatably mounting shaft 164. Rotor 148 is countersunk to receive the proximal end of the arbor, the latter having a flange 131 secured by screws to a shift plate 137 which is contiguous to the face of the base plate opposite to the face from which extensions 173 project. Plate 137 (FIGS. 10 and 10*a*) is rotatably mounted on the base plate by a pin 139 and operates to move the spindles into two different positions to accommodate cartridges of two different sizes. The shift plate is guided by a pin 141 received within an arcuate slot 143 in the base plate. The means for shifting the shift plate will be described hereinafter.

Shaft 162 is rotatably mounted by a first bearing 166 carried by an axial extension of rotor 148 and by a second bearing 167 carried by a second arbor 169 forming an axial extension of a wheel 165 secured to shaft 164 by a set screw 163. A disk 161 is secured by screws to one face of wheel 165 and surrounds arbor 169. Disk 161 is received within the groove 155 of an eddy current motor 157 carried by the base plate and is rotated thereby for a record or playback operation when the disk is out of engagement with the motor. For a fast-forward operation, the motor is moved by means (not shown) into engagement with the outer periphery of disk 161 to rotate the latter at a relatively high speed.

To rotate shaft 162, a rotatable drive means 159 is carried by the base plate and moves into engagement with a cylindrical clutch member 103 rotatably mounted on shaft 162 and forced by a compressed spring 111 into face-to-face engagement with a wheel 145 secured by a set screw 147 to shaft 162. Wheel 145 has an annular groove 149 for receiving a conventional drag line to provide a drag force on shaft 162 during a record or playback operation. A pair of brakes 151 and 153 are shiftably mounted for selective movement into engagement with the outer peripheries of clutch member 103 and wheel 165, respectively, to stop the rotational movements thereof.

Each of rotors 134 and 148 (FIG. 11) has a cylindrical outer periphery provided with a number of spaced openings through each of which a portion of a shiftable detent extends. For purposes of illustration, each rotor has three detents, rotor 134 having detents 136 and rotor 148 having detents 156. Rotor 134 has a recess 138 in its outer end face for each detent 136, respectively, each recess having the shape shown in FIG. 12 to permit its detent to shift between the full and dashed line positions. A spring 140 biases each detent 136 outwardly of its recess so that an outer end portion 142 of the detent projects through an opening 171 (FIGS. 11 and 12) and beyond the outer periphery 177 of rotor 134. In this position of the detent, its flat, outer end face can abut the flat side of the adjacent tooth of a plurality of inner peripheral teeth 124 (FIGS. 4 and 6) on hub 34 so that the detent will be in driving engagement with the tooth to cause rotation of hub 34 in the direction of arrow 179. A cap 135 (FIG. 11) is secured by screws 162*a* to the outer end face of rotor 134 to retain the corresponding detents and springs in their recesses and to allow the detents to shift in the recesses.

Each detent 156 of rotor 148 is shiftably disposed in a recess 181 (FIG. 11) in the outer end face of the rotor. A spring 183 biases the detent outwardly of the recess so that an end portion 185 of the detent (FIG. 11) can project through an opening 187 at the outer periphery 189 of rotor 148 and into face-to-face engagement with the flat side of one of a number of inner peripheral teeth 126 on hub 38. Thus, the detent can drive the tooth and thereby hub 38, both sets of detents for the rotors being oriented to rotate the rotors in the direction of arrow 179 (FIG. 12). A cap 191 (FIG. 10) is provided for rotor 148 and serves the same purpose as cap 135 of rotor 134.

Rotor 134 has an annular flange 144 having a flat side face 146 for engaging the proximal flat end face of hub 34 when the latter is mounted on the rotor. Similarly, rotor 148 has an annular flange 158 having a flat side face 160 for engaging the proximal flat end face of hub 38. Also the detents and recesses of the two rotors are substantially of the same size and shape.

Hubs 34 and 38 have central openings therethrough of different diameters so that the hubs can move onto respective rotors 134 and 148. These openings define the inner peripheries for the rotors and teeth 124 and 126 are disposed on these inner peripheries and extend radially inwardly of the corresponding openings. Each of these teeth is defined by a pair of relatively convergent sides which extend axially of the corresponding hub. Teeth 124 are located on one side of an annular boss 128 (FIG. 6) having first and second annular, beveled side surfaces 130 and 132, surface 130 having a greater bevel angle than surface 132. Teeth 126 are located on one side of an annular boss 150 having first and second annular, beveled side surfaces 152 and 154, surface 152 having a greater bevel angle than surface 154.

Surfaces 132 and 154 of bosses 128 and 150 cause respective detents 136 and 156 to be cammed into their recesses 138 and 181 as hubs 34 and 38 are urged onto rotors 134 and 148, respectively. After the detents pass the radially innermost extremities of the respective bosses 128 and 150, surfaces 130 and 152 of the bosses permit the detents to move outwardly of these recesses for continued movement of the hubs onto respective rotors. This action permits the hubs to be literally pulled onto the rotors due to the relatively steep bevel angle of surfaces 130 and 152 until the end faces of the hubs engage the flat end faces of flanges 144 and 158 of the rotors. In this way, the tape reels are releasably connected to the spindles. Reverse movement of the hubs relative to the rotors again causes the detents to be cammed inwardly to allow the boss to move axially of the rotors.

Front wall 14 of cartridge housing 12 has a central opening 168 (FIG. 2) for receiving the spindles as the cartridge is moved toward the base plate. This opening can be provided with a removable closure, if desired. The closure can be made to open automatically when the cartridge is placed in carriage mechanism 232.

CARRIAGE MECHANISM 232

This mechanism includes a bucket or outer container 300 (FIGS. 14 and 16) and an ejector or outer container 301 shiftably mounted in the bucket for up and down movement therein. The cartridge is adapted to be received within the ejector when the latter is in its up position. Then the cartridge and the ejector are forced downwardly until the ejector is releasably latched to the bucket in a manner to be described in its down position. In such position, the ejector properly aligns the cartridge for movement toward and onto the spindles. Also, as the cartridge is moved downwardly with the ejector into the bucket, the cartridge (FIGS. 8*a*, 8*b* and 16) moves from the position of FIG. 8*a* to the position of FIG. 8*b*, so that the splines 230 push tabs 222 inwardly thus unlatching top 24 and permitting it to be opened by arms 234 (FIGS. 8 and 8*c*) when the carriage mechanism is moved toward the base plate. Furthermore, movement of the cartridge into the ejector causes projection 108 of brake unit 90 (FIGS. 2, 3 and 4) to be forced inwardly to release the tape reels for rotation within the cartridge housing.

Bucket 300 comprises an open top receptacle (FIG 16) having a pair of opposed, generally parallel sides 302 and 303, a front wall 304, a rear wall 305 (FIG. 19) and a bottom wall 306. Sides 302 and 303 have the two splines 230 which are used to unlatch cartridge top 24, the splines being secured to and extending inwardly from the inner surface of the sides near the upper ends thereof. The splines can enter respective grooves 226 when the cartridge is first inserted in the ejector because the splines extend through respective slots 307 and 308 in the generally parallel sides 309 and 310, respectively, of ejector 301. Front wall 304 of the bucket has a substantially rectangular opening 311 (FIG. 16) therethrough for receiving spindle structure 133(FIG. 1) and extensions 173 (FIG. 10) which project laterally from the base plate. The upper edge of front wall 304 has a pair of open top recesses 312 for receiving alignment pins 172 (FIG. 10) as the bucket moves toward the base plate. A pair of rigid legs 313, only one of which is shown in FIGS. 13, 14 and 15, are secured to and extend forwardly from the bucket near the lower end thereof for attaching the same to structure 314 (FIGS. 13, 14 and 15) hereinafter described, for mounting the bucket on the base plate for movement toward and away therefrom.

Ejector 301 has a front wall 315 (FIG. 19), rear wall 316 (FIG. 19) and a bottom wall 317. Front wall 315 has a large, open top recess therein defined by a pair of convergent side edges 318 and a bottom edge 319. Sides 309 and 310 of the ejector have respective guide bars 320 and 321 on the inner surfaces thereof in alignment with slots 307 and 308 for entering grooves 226 (FIGS. 2 and 2a) in the sides of the cartridge housing. These guide bars, disposed near front wall 315 (FIGS. 17 and 18), have upper ends terminating near the lower ends of slots 307 and 308, (FIG. 16) and are wider at their lower portions than at their upper portions to complementally fit into the wider, lower portions of grooves 226. The lower, wider portion of guide bar 321 is shown in FIG. 18 and the upper, narrower portion of guide bar 320 is shown in FIG. 17.

Sides 309 and 310 of the ejector have grooves 322 and 323, respectively, for receiving guide pins 324 and 325 secured to and extending inwardly from a pair of fixed vertical support plates 326 and 327 which are embedded or otherwise anchored at their side edges in the front and rear walls of the bucket (FIGS. 18 and 19) and thereby span the distance between such front and rear walls. Plates 326 and 327 can be inserted into the bucket through bottom openings 328 (FIG. 16). Thus, splines 230 and guide pins 324 and 325 determine the position of the ejector in the bucket and keep the ejector from moving within the bucket except for up and down movement. The ejector is retained within the bucket by splines 230 which engage ejector sides 309 and 310 at the lower ends of respective slots 307 and 308.

The ejector is latched in its down position by a spring wire 329 (FIGS. 16 and 19) which extends along the upper surface of bottom wall 306 of the bucket. One end of the wire extends into a sleeve 330 rigid to the bottom wall near bucket sidewall 302. Wire 329 is in vertical alignment with the inclined surface 331 (FIG. 1) of a wedge-shaped latch member 332 rigid to and depending from bottom wall 317 of the ejector at the center thereof. The latch member has a shoulder at the upper end of inclined surface 331 which hooks or latches under wire 329 (FIG. 1) so that the ejector cannot move upwardly until the wire is moved laterally and into position of FIG. 1, the bowed position of FIG. 19, thus clearing the shoulder. When this occurs, a pair of arcuate leaf springs 333 and 334 between the bottom walls of the bucket and the ejector force the ejector into its up position. Spring 333 is secured by screws to the lower surface of the bottom wall of the ejector and engages the bottom wall of the bucket. Spring 334 is secured by screws to the upper surface of the bottom wall of the bucket and engages the bottom wall of the ejector, both springs being compressed to provide an upward bias force on the ejector when the latter is in its down position.

To move the wire to clear the latch member, an unlatching link 335 is provided, the link having an ear 336 (FIG. 16) through which the wire shiftably extends. Link 335 is pivoted by a pin 337 on bottom wall 306 for movement in a clockwise sense when viewing FIG. 19 to urge the wire into its bowed position in which it clears the latch member. To pivot link 335, an arm 338 (FIG. 16) pivotally carried by a pin 339 on support plate 327 (FIG. 16) has a lower end 340 which is normally in engagement with the outer end 341 (FIG. 19) of link 335 and pivots the same in a clockwise sense when viewing FIG. 19 when arm 338 moves in a clockwise sense when viewing FIG. 14 relative to the bucket.

Arm 338 has a lateral tab 342 which projects through arcuate openings 343 and 344 (FIG. 16) in support plate 327 and side 303 of the bucket and beyond the bucket for engagement by a trip 345 (FIG. 14) carried at the end of a side plate 346 forming a part of mounting structure 314. The way in which trip 345 causes rotation of arm 338 will described hereinafter.

Mounting structure 314 includes a pair of spaced side plates 346 for mounting the opposed sides of the bucket for movement toward and away from the base plate. The side plates are integral with or otherwise secured to a bottom plate 347 (FIG. 15) having a vertical flange 348 (FIGS. 14 and 15) secured by screws to the lower margin of the base plate, whereby side plates 346 are rigidly secured thereto. Side plates 346 extend through respective openings in the base plate and are generally horizontally disposed relative thereto.

Each side plate has a channel-shaped rear portion 349 (FIG. 14a) defining a track or integral slide formation for an adjacent bearing 350 rotatably mounted on a bushing 351, telescoped on a stud 352 secured to and projecting laterally from the bucket adjacent to its lower end. Bearing 350 rolls on the upper surface of a lower rail 353 while an upper rail 354 confines the bearing between the rails, the latter being interconnected by a side 355 (FIG. 15).

Each side plate 346 further has a front portion 356 which has a pair of interconnected, relatively angularly disposed slots 357 and 358, slot 357 (FIG. 13) extending upwardly and slightly rearwardly of slot 358. The slots of each side plate 346 are provided to receive and guide a stud or follower 359 secured to and extending laterally from the adjacent leg 313 of the bucket. Slot 358 allows stud 359 to move linearly forwardly or to the right when viewing FIGS. 13 and 14, whereby the bucket can move toward the base plate 176 until the bucket positions the cartridge in its operative position shown in FIG. 13. When the bucket is in this position, stud 359 is spaced a short distance from the right-hand end of slot 358. Slot 357 allows movement of stud 359 upwardly so that the bucket can tilt into the dashed line position of FIG. 14 at which a cartridge can be inserted into or taken out of the bucket. This dashed line position is the rearwardly inclined and retracted position for cartridge acceptance and return. The full line position of bucket 300 in FIG. 14 is the vertical and retracted intermediate position. The slot formations 357, 358 and followers 359 on legs 313 define the angular and linear displacement of the pivot means 350, 351, 352 and bucket 300. Each side plate 346 has a flange 360 (FIG. 14) which limits the upward movement of the adjacent leg to a predetermined angle. The flange can have a bumper on its lower surface to cushion the force exerted thereon by the leg.

When the bucket is tilted rearwardly, trip 345 (FIG. 14) restrains tab 342 (FIG. 16) and thereby arm 338 from tilting with the bucket. Thus, the bucket moves relative to arm 338 which, in effect, means that the arm moves forwardly in opening 344 relative to the bucket, causing link 335 (FIGS. 16 and 19) to pivot in a clockwise sense when viewing FIG. 19. Thus, if the ejector is initially latched to the bucket, it will become unlatched therefrom and will spring upwardly under the influence of leaf springs 333 and 334. A cartridge in the ejector can then be grasped and pulled upwardly and out of the ejector. After arm 338 has swung link 335 sufficiently to unlatch the ejector, tab 342 passes beneath trip 345, allowing arm 338 to return to its initial position by virtue of the bias force on ear 336 of link 335 by wire 329. When the bucket is again moved into its vertical position, tab 342 will strike trip 345 and the movement of the bucket will cause arm 338 to pivot relative to the bucket but in a counterclockwise sense and thereby away from link 335. Thus, the link is not moved by arm 338 during this forward bucket movement. The tab then passes beneath the trip and arm 338 returns to its initial position by virtue of its own weight.

To stabilize the connection between the bucket and side plates 346 and to facilitate the movement of the bucket relative thereto, a pair of tie bars 361 are provided at respective sides of the bucket, each tie bar being between the bucket and the adjacent side plate 346 (FIGS. 14a, 14b and 15). Each tie bar has a rear end which is provided with a hole therethrough for receiving bushing 351 (FIG. 14a). The tie bar then extends forwardly and has another hole through its opposite end for rotatably receiving a shaft 362 (FIG. 15) near the adjacent outer end of which is mounted a pinion 363 which meshes with a rack 364 which is secured in any suitable manner to the outer surface of the adjacent side plate 346 immediately below the corresponding slot 358. Shaft 362 is perpendicular to the direction of movement of the bucket and provides pinion mounts which extend through slots 358 of side plates 346.

The arrangement is such that, after bucket 300, with legs 313, is tilted clockwise (FIG. 14) studs 359 sliding downwardly in slots 357, then the bucket, with legs 313, is pushed forwardly toward plate 176, bearings 350 rolling along rails 353, the rods 361 moving to the right (FIG. 14), sprocket 363 being turned clockwise by rack 364, studs 359 sliding to the right in slots 358.

A slotted link 365 is provided for each end of the shaft 362 to bias the same forwardly after the shaft has moved a relatively short distance to the right when viewing FIGS. 13 and 14. Each link 365 is pivoted at one end on a stub shaft 366 secured to and extending laterally from the adjacent side plate 346 and has a slot 367 therein which receives the proximal end of the shaft. A coil spring 399 is secured at one end to a projection 370 on link 365 and at the other end to an ear 369 on plate 347. When the bucket is in the position shown in FIG. 14, springs 399 one on each side of plate 347, are in substantial alignment with the stub shafts 366 of corresponding links 365, i.e., are over dead center with respect to the pivots of links 365 (FIG. 14). As the bucket moves forwardly, the springs move away from such dead center positions and then bias their links in a clockwise sense when viewing FIGS. 13 and 14, thus biasing bushings 351 and the bucket toward the base plate. FIG. 13 shows links 365 in a generally vertical position when the bucket is in its forwardmost position. Thus, springs 399 tend to keep the bucket in this position.

The bucket and the ejector cooperate with spindle structure 133 to permit cartridges of two different sizes to be used with apparatus 8. Shift plate 137 (FIG. 10) is to be in a down position for a cartridge of a relatively large size, such as cartridge 10, and is to be in an up position for a cartridge of a relatively small size, i.e., one whose height is less than that of cartridge 10 but has substantially all other features thereof. Thus, it is necessary to provide a means for sensing the size of a particular cartridge placed in the ejector and to position shift plate 137 and thereby the spindles thereon accordingly. This is achieved by means within the bucket for sensing the height of the cartridge and such sensing means cooperates with structure for moving the shift plate into the proper location before the tape reels move onto the spindles.

The aforesaid sensing means includes a pair of leaf springs 371 and 372 (FIG. 10*b* and 16) having upper ends secured to the outer surface of side 309 of the ejector and passing through the upper end of an elongated opening 373 therethrough and downwardly along the inner surface of side 309. Inside the ejector, the springs are generally parallel with each other and can move toward and into opening 373 when the bottom of cartridge 10 engages the inclined upper surface 374 of leaf spring 371 and is forced downwardly to urge the springs in a direction outwardly of the ejector. The lower ends of the springs extend into an opening 375 in bottom wall 317 of the ejector which limits the inward movement of the springs.

Spring 372 has a vertical slot 376 (FIG. 10*b*) therein which receives the head of a horizontal pin 378. The head engages spring 371 and has an annular groove which frictionally receives the sides of spring 372 defining slot 376, whereby the head is anchored to the spring. Pin 378 has a first segment 379 of relatively large cross section and a second segment 380 of relatively small cross section, segment 379 normally extending only through opening 373 and segment 380 extending through the enlarged end 381a (FIG. 10*c*) of a slot 381 (FIG. 10*b*) in a shift arm 382 when the bucket is tilted to the rear as shown in FIG. 14. Arm 382 is pivotally mounted by a pin 383 (FIG. 16) on the adjacent support plate 326 in axial alignment with the adjacent stud 352 secured to side 302 of the bucket. Segment 380 also shiftably extends through a bushing 384 aligned with a hole 385 in the side of the bucket, whereby segment 380 can shift laterally of the bucket and support plate 326. A slot 386*a* permits extension 386 (FIG. 10*b*) to project forwardly of the bucket.

Shift arm 382 (FIGS. 10*a*, 10*b* and 19) has a forward extension 386 provided with a slot 387 therein for receiving a pin 388 on the lower end of a link 389, the latter being pivotally secured at its upper end to a lever 390, one end of which is pivotally mounted by a pin 391 on the adjacent face of the base plate. A fixed pin 392 on the base plate extends through a slot 393 in link 389 for guiding the same as it moves up and down under the influence of shift arm 382. The opposite end of lever 390 is pivotally mounted on a pin 394 secured to shift plate 137, the latter being biased in an up position by a coil spring 395 secured at its ends to the base plate and the shift plate, respectively. When the shift plate is in the up position, the common axis of the spindles thereon is in vertical alignment with the position of such axis when the shift plate is in the down position.

When a relatively short cartridge is in the ejector, springs 371 and 372 are not forced outwardly of the ejector by the cartridge; thus, segment 380 of pin 378 remains in enlarged end 381*a* of slot 381 and can move in this slot as the bucket moves from its tilted position (FIG. 10*b*) to its vertical position prior to being moved relative to side plates 346 toward the base plate. The bucket moves relative to shift arm 382; shift plate 137, therefore, remains in its up position and the spindles thereon are properly aligned with the tape reels of the cartridge to receive the same.

As the bucket moves the cartridge linearly into operating position (FIG. 13) the link 382 turns counterclockwise, the extension 386 sliding along pin 388 (FIGS. 10*b*) and the slot 381 moving relative to pin 379.

To receive cartridge 10, the bucket must be in the tilted position to allow segment 379 to be moved into end 381*a* of slot 381 of shift arm 382. When a relatively long cartridge is inserted into the ejector and forced downwardly to cause latching of the ejector, the cartridge engages spring 371 and 372 forces the springs and pin 378 in a direction outwardly of the ejector. This action forces enlarged segment 379 into end 381*a* of slot 381 to rigidly couple the bucket to shift arm 382. Thus, when the bucket is pivoted from its tilted position to its vertical position, it causes shift arm 382 to shift with it and this, in turn, causes link 389 and lever 390 to urge shift plate 137 into its down position with the spindles thereon in alignment with the tape reels of the cartridge. The bucket is then moved forwardly relative to side plates 346 to move the tape reels onto the spindles.

When the bucket is returned to its rearmost vertical position, after operation with the long cartridge shift plate 137 remains in its down position. However, it moves to its up position when the bucket is tilted rearwardly since segment 379 remains clutched in end 381*a* of slot 381. When the cartridge is lifted out of the ejector, springs 371 and 372 return to their initial positions and spring 372 pulls segment 379 out of end 381*a* and pulls segment 380 thereinto.

ROTARY HEAD ASSEMBLY 11

Assembly 11, shown in FIGS. 1, 20 and 23, includes a scanner disk 400 to the outer peripheral margin of which are secured three circumferentially spaced magnetic scanning heads 401, 402 and 403 at locations permitting the heads to scan tape stretch 46 (FIGS. 20 and 23) of flexible, magnetic tape 44 carried by cartridge 10 and removably held by tape guide system 253 along a portion of the arcuate path of travel of the heads. The heads are axially staggered, i.e., disposed in parallel planes, relative to each other so that assembly 11 can provide the tape conserving aspects of the skip-field principle wherein only selected fields of a series of video image frames are recorded but each field is played back a number of times to provide a video picture of acceptable quality.

Disk 400 has a hub 404 secured to one end of a generally horizontal shaft 405 for rotation about an axis substantially parallel with the common axis of the reel drive spindles. Shaft 405 is mounted in a pair of spaced bearings, such as 407, for rotation within an arbor 406 secured to and extending through base plate 176 (FIG. 1). Shaft 405 is coupled with a motor (not shown) which rotates the shaft and thereby disc 400 at a predetermined speed.

Disk 400 (FIG. 1) has an annular ring 408 secured to one face thereof and extending laterally therefrom concentric with shaft 405. An annular support 409, such as a printed circuit board, is secured by screws to the outer end face of ring 408 in covering relationship to the space between the ring and hub 404. Each scanning head has a playback pre-amplifier 410 mounted on support 409, one amplifier being shown in block form in FIG. 1 in the space between the ring and hub 404. The outputs of the amplifiers can be fed to a switching network also carried by support 409 and the output of the switching network can be directed to a commutator 411 having a rotating part secured to disk 400 and a fixed part secured to a stationary web 412 (FIG. 20). In this way, the signals sensed by the heads during a playback mode can be amplified before the signals are transferred through the commutator to playback circuitry remote from assembly 11.

A pair of fixed, arcuate tape guides or clam shells 413 and 414 are secured to the base plate on opposite sides of disk 400 as shown in FIGS. 1 and 23 for guiding and contouring tape stretch 46 so that it is in position to be scanned by the scanning heads. The clam shells have semi-cylindrical outer surfaces 415 and 416, respectively, shown in flat conditions in FIG. 23 for purposes of illustration only. Clam shell 413 is secured by web 412 to the base plate by screws passing through side mounts 417 (FIG. 20). Clam shell 414 is secured by a web 418 (FIG. 1) to the proximal end of base plate 176. The spacing between the clam shells is only slightly larger than the thickness of disk 400 so that the disk is in proximity to the clam shells yet it can rotate without engaging the clam shells.

A pair of guides 419 and 420 (FIG. 23) are secured by screws to clam shells 413 and 414, respectively. Each of these guides has a straight end face 421 for engaging the proximal side edge of tape stretch 46 for guiding the same as it moves along the clam shells. End faces 421 are parallel with each other and are canted with respect to the plane of rotation of disk 400, whereby tape stretch 46 is at a helical angle with respect to the path of travel of the scanning heads. A third guide 422 (FIG. 1) is secured to clam shell 413 between guides 419 and 420 and has a cylindrical outer surface which provides line contact with the adjacent tape side edge.

Clam shell 413 has a hole 423 (FIG. 13) through which a control head 424 secured to the clam shell can protrude. Similarly, clam shell 414 has a hole 425 through which an audio head 426 can protrude. Head 424 is adapted to scan one side margin of tape stretch 46 for sensing or recording a control track thereon and head 426 is adapted to scan the opposite side margin of the tape stretch for sensing or recording an audio track thereon.

An erase head 427 (FIGS. 20, 21 and 22) is mounted on the base plate adjacent to the path of travel of the tape for erasing signals thereon before the tape approaches rotary head assembly 11. A cylindrical flutter guide 428 is rotatably mounted adjacent to erase head 427 on the base plate and supports the tape as the latter moves past the erase head.

TAPE GUIDE ASSEMBLY 253

This assembly includes tape guides 254 and 256 (FIGS. 3, 5, 10*a*, 20, 21, 22, 23 and 24) which are movable upwardly and into operative positions in which they urge tape stretch 46 about clam shells 413 and 414. FIG. 22 shows tape guides 254 and 256 intermediate their upper and lower positions and illustrates how the tape stretch is supported at its ends by the tape guides as the clam shells contour the tape stretch in a manner such that the heads on disk 400 can scan the tape stretch.

Tape guide 254 is longer than tape guide 256 (FIGS. 5 and 23). The tape guides 256 and 254 are rigidly secured to the lower ends of respective drag links 451 and 450 (FIG. 21), the upper ends of which are pivotally secured to lift arms 454 and 455, respectively, by pins 452 and 453. Arms 455 and 454 are pivotally secured by pins 456 and 457 to the outer ends of respective radius arms 458 and 459 whose inner ends are rotatably mounted on arbor 406 (FIG. 1) between the plane of base plate 176 and the plane of web 414*a*. Each of the lift arms has an extension 460 connected by a spring 461 to the adjacent radius arm, the spring serving to bias the extension toward the radius arm yet allow the lift arm to pivot relative to and away from the raduis arm. Each extension 460 is notched to permit the corresponding spring to be adjustably mounted thereon.

Each of the drag links 450 and 451 has an inclined upper surface 462 (FIGS. 1 and 22a) for complementally engaging a respective inclined surface 463 (FIG. 22*a*) mounted on the adjacent surface of clam shell 414. Surfaces 463 thus force the drag links against the web 418 and properly position guides 254 and 256 relative to disk 400 each time the last-mentioned guides are moved out of the cartridge and upwardly into their operative positions adjacent to assembly 11. Thus, interchangeability of tape cartridges can be realized. This action is further explained below.

The means for rotating radius arms 458 and 459 about arbor 406 includes a pair of toggle links 464 and 465 which are pivotally connected at their upper ends by pins 466 and 467 on the radius arms in spaced relationship to arbor 406. The lower ends of the toggle links overlap each other and are pivotally connected by a pin 468 on the upper end of a master link 469 whose lower end is pivotally connected by a pin 470 on the outer peripheral margin of a crank wheel 471 mounted on a shaft 472 for rotation relative to the base plate. Pin 468 is guided in a vertical slot 468*a* (FIG. 22) in web 418. Drive structure 473 (FIG. 1) is carried by the base plate and coupled to shaft 472 for rotating the same in a manner to rotate wheel 471 through a half revolution in a counterclockwise sense when viewing FIG. 22 to elevate master link 469 from its lowest position (FIG. 21) to its highest position extending radially upwardly from wheel 471. As this occurs, the toggle links force the radius arms to rotate upwardly and about arbor 406. Thus, the drag links are moved from their lowest positions with tape guides 254 and 256 within the tape cartridge to upper positions at which the tape guides position the ends of tape stretch 46 adjacent to the clam shells. FIG. 22 shows an intermediate position of master link 469.

Clam shell 414 has its web 418 (FIG. 22*a*) secured by screws to base plate 176. Web 418 has a groove 475 in the outer face thereof for each drag link, respectively, each groove having a lower, generally vertical segment 476 (FIG. 22) and an upper, generally arcuate segment 477. Each drag link has a follower 478 (FIG. 5) axially aligned with the corresponding tape guide thereon and the follower is loosely received within the adjacent groove 475 (FIGS. 22 and 22*a*). Thus, the tape guides initially move vertically in segments 476 to pull straight upwardly from the tape cartridge. Then the guides move outwardly and upwardly of segments 476 until followers 478 are received within upper, narrowed sections 479 of respective groove segments 477. Thus, the loose fit of the followers in the major portions of grooves 475 allows the drag links to be easily elevated into their operative positions. However, as the drag links approach these operative positions, the followers enter sections 479 and precisely locate the drag links and the tape guides thereon laterally of the clam shells. Also, the followers enter sections 479 as surfaces 462 on the drag links move into engagement with respective inclined surfaces 463 (FIG. 22*a*). Thus, the positions of tape guides 254 and 256 are determined with respect to the clam shells and the base plate to assure interchangeability of tape cartridges.

A pinch roller link 480 is pivotally secured at one end by a pin 481 to radius arm 458 and at the opposite end to a shaft 482 which pivotally interconnects the overlapped ends of a pair of angularly disposed legs 483 and 484. Pinch roller 262 is rotatably mounted on the outer end of leg 483 and a pin 485 pivotally connects the outer end of leg 484 to the base plate. A coil spring 486 interconnects the two legs and biases them toward each other about shaft 482. Thus, the legs can move as a unit with link 480 to cause pinch roller 262 to move upwardly toward capstan 266 (FIG. 22) to force the tape against the same, whereby the tape can be driven in the desired direction by the capstan.

Each of the guides 254 and 256 has a conical outer surface and is initially adjustably secured by a screw 487 to the adjacent drag link. This feature is to allow small adjustments in the orientations of the guides on the drag links when the latter are in their elevated, operative positions. After the adjustments have been made, the attachment of the guides to the drag links can be made permanent by filling the outer ends of the guides with a bonding material, such as a resin, to prevent access to screws 487.

DETAILED OPERATION

Apparatus 8 is readied for operation by first bringing disk 400 and capstan 266 up to operating speeds. This is accomplished by energizing their motors (not shown) by suitable control means (not shown) forming a part of apparatus 8. A cartridge is selected and placed in the ejector when the bucket is tilted rearwardly (FIG. 14). When the cartridge is placed in the ejector, guide bars 320 and 321 (FIG. 16) enter grooves 226 (FIG. 2*a*) at the sides of the cartridge to guide the latter into the ejector. These guide bars and grooves are assymmetrically located between the front and rear walls of the ejector and the cartridge to allow the cartridge to be inserted into the ejector only with the front wall of the cartridge adjacent to the front wall of the ejector. When guide bar 321 engages projection 108 (FIG. 3) or brake unit 90, it forces the projection inwardly of the cartridge to release the brake unit and to allow the tape reels to rotate therewithin. Continued movement of the cartridge into the ejector causes splines 230 (FIG. 16) to unlatch the latch members 222 (FIGS. 8*a* and 8*b*), thus permitting top 24 to be opened by arms 234 (FIG. 8) when the bucket moves toward the base plate.

If the cartridge is of a relatively large size, such as cartridge 10, it will engage spring 371 (FIG. 16) and force the latter and pin 378 outwardly of the ejector. The enlarged segment 379 of pin 378 will then enter end 381a of slot 381 of shift arm 382 (FIG. 10*b*), thus rigidly coupling the latter to the bucket. The cartridge is forced with the ejector into the bucket until latch member 332 (FIGS. 1 and 16) is hooked beneath wire 329, whereby the ejector is held in the down position in the bucket. When the bucket is pivoted into its vertical position, pins 236 on arms 234 (FIGS. 8 and 8*c*) enter grooves 210 in cartridge top 24 and shift arm 382 (FIG. 10*a*) moves with the bucket and urges spindle shift plate 137 into its down position wherein the spindles thereon are in alignment with the tape reels of the cartridge. If the cartridge is relatively small, it will not force spring 371 out of the ejector. Instead, it will have a shoulder on each side which will engage the shoulder at the junction of the upper narrow portion and the lower wider portion of the adjacent guide bar on the ejector. As shown by the upper part of guide bar 320 in FIG. 17 and the lower part of guide bar 321 in FIG. 19, there is a discontinuity in each guide bar, the upper portion being narrow and the lower portion being wide. A cartridge having grooves 226, per FIG. 2, accordingly slides all the way down into the ejector (FIG. 16) and then pushes springs 371, 372 outwardly. But a small cartridge, without the widened lower portion of grooves 226, effectively has shoulder formations so that the small cartridge is arrested by the discontinuities and does not slide down into the ejector sufficiently to contact those springs. Accordingly, in the case of a small cartridge, the link 382 is not clutched to the bucket by displacement of the enlarged segment 379. The spindle thus remains in the proper position to receive the tape reels of the smaller cartridge.

To facilitate movement of the bucket, it is provided with a handle 396 (FIG. 1) adjacent to its upper, open end. The handle has a finger-receiving recess 397 on its lower face to facilitate the grasping of it.

The bucket is manually moved forwardly toward the base plate. During this movement, top 24 is opened by arms 234 and links 365 (FIGS. 13 and 14) will be urged forwardly by their springs 399 to bias the bucket toward the base plate and thereby facilitate the movement of the bucket. As the bucket nears the base plate, the spindle rotors 134 and 148 enter opening 168 in cartridge housing wall 14 and then enter respective tape reel hubs 34 and 38 (FIG. 6). Detents 136 and 156 of respective spindle rotors are urged inwardly by adjacent annular hub bosses 128 and 150 (FIG. 6) and, after passing the bosses, spring outwardly to literally pull the reel hubs onto the spindle rotors and against the rotor flanges when the cartridge is in its operative position (FIG. 1) below rotary head assembly 11. The detents pass into the spaces between adjacent pairs of inner peripheral teeth on the hubs; hence, the tape reels are mounted on the spindle rotors and can rotate therewith since brake unit 90 has previously been released.

As the bucket approaches the base plate, the following occur: tape guides 254 and 256 and pinch roller 262 are received within respective recesses 250, 252 and 264 (FIG. 3) below tape stretch 46; guide pins 172 pass through the bucket and the ejector and enter the cartridge (FIGS. 9 and 10) to orient the cartridge relative to the base plate; extensions 173 (FIG. 10) move into engagement with wall 14 of cartridge housing 12 to maintain the latter at a fixed distance from the base plate for proper tape reel rotation within the housing; photocell 280 (FIG. 9) passes through the bucket and the ejector and enters the cartridge; and pin 188 passes through the bucket and the ejector and enters the cartridge only if knock-out tab 186 (FIG. 3) is removed; otherwise, pin 188 engages wall 14 and is forced toward the base plate to actuate switch 190. When the cartridge is in its operative position (FIG. 1), top 24 is fully open and tape stretch 46 is exposed.

For a record or playback operation, tape guides 254 and 256 are moved upwardly by actuating drive structure 473 (FIG. 1) which rotates crank wheel 471 (FIG. 21), causing master link 469 to move from the vertical, down position to the vertical, up position. This action causes radius arms 458 and 459 to rotate upwardly about arbor 406 (FIGS. 21 and 22), pulling drag links 451 and 450 upwardly and about clam shells 413 and 414. Followers 478 are guided in tracks 475 and enter restricted sections 479 to orient the tape guides 254 and 256 properly relative to the radial distance from the path of travel of the scanning heads. Also, inclined surfaces 462 of the drag links move into engagement with the adjacent surfaces 463 (FIG. 22*a*) to force the drag links toward the web 418 and into positions in which the tape guides are properly spaced from the base plate.

As tape guides 254 and 256 move upwardly with the drag links, they pull tape stretch 46 upwardly and about a portion of the arcuate path of travel of the scanning heads. In their full up positions, the tape guides support the ends of the tape stretch and the latter is contoured by the clam shells.

As the drag links are elevated, link 480 (FIG. 22) causes pinch roller 262 to be moved upwardly and into its operative position at which it forces the adjacent portion of the tape against capstan 266 so that the tape can be driven thereby. Both disk 400 and capstan 266 will have been placed into rotation, so that the tape will commence to move immediately when the tape guides and the pinch roller reach their operative positions. Also, eddy current motor 157 will be actuated at this time to cause rotation of take-up reel 32, supply reel 30 being free to pay out tape since motor 159 is not coupled with shaft 162 although a drag force will be applied to the latter to maintain a certain amount of tension on the tape.

As the heads rotate, they scan the moving tape along oblique tracks 398 shown only schematically in FIG. 24 since the tracks will not be visible. During a record mode, signals are recorded on the tracks by one of the heads as the tape moves at a record speed. During a playback mode, signals are sensed by all the heads which scan each track for each revolution of disk 400 as the tape moves at a playback speed. Following a record or playback operation, the tape guides and pinch roller are returned to their initial positions, allowing tape stretch 46 to return to the cartridge. The tape can then be rewound by actuating motor 159 (FIG. 10) to rotate shaft 162 and thereby supply reel 30. The end of the tape will be sensed by photocell 280 to cause the rewind operation to stop. The bucket can then be pulled away from the base plate and arms 234 close top 24 as the tape reels move off the spindles. The bucket is then tilted rearwardly and the ejector is then unlatched since trip 345 holds tab 342 from pivoting with the bucket to, in turn, cause link 335 to pivot in a direction to bow wire 329. This moves the wire laterally of the ejector latch member so as to clear the same; thus, springs 333 and 334 then elevate the ejector and the cartridge within the bucket. As the cartridge is elevated, it moves upwardly relative to splines 230 so that latch members 222 are returned to their latched positions (FIG. 8*a*). The top is then releasably secured to cartridge housing 12 once again.

A fast-forward operation of the tape can be performed when the cartridge is in its operative position (FIG. 1) and when tape stretch 46 is in the cartridge. This is accomplished by moving eddy current motor 157 (FIG. 10) toward disk 145 so that the outer periphery of the latter engages the motor within groove 155. This action rotates shaft 164 at a relatively high speed to advance the tape onto the take-up reel.

Another tape guide can be placed in the cartridge at a location below tape guide 74 and in vertical alignment therewith in the vicinity of web 86 (FIG. 3). This new guide would have a bearing 76 thereon and tape would extend between the new guide and guide 74 before the tape is directed onto the takeup reel. Thus, the two guides, namely the new guide and guide 74 would determine points of support for an internal stretch of tape which would isolate such tape stretch from any drift of the tape relative to guide 70. Thus, the wrapping of the tape on the takeup reel would not be affected by such tape drift. Subject matter disclosed, but not claimed herein, is claimed in various ones of the following copending United States patent applications, assigned to the same assignee as the present application and filed on the same day, June 26, 1970: as to the guide assembly generally, patent application Ser. No. 50,245, William W. Swain and Richard A. Hathaway, entitled "Drive for Tape Guides of Tape Transport;" as to the cartridge, patent application Ser. No. 50,125, William W. Swain, entitled "Tape Cartridge;" as to the shift plate for the spindles, patent application Ser. No. 50,244, William W. Swain, entitled "Shiftable Spindle for Tape Transport;" as to the shapes of the pick-up elements, patent application Ser. No. 50,056, Thomas J. Larkin entitled "Tape Guide System." As to the combination of the cartridge and the cartridge displacement apparatus please see the copending patent application of William W. Swain and Richard A. Hathaway, Ser. no. 134,677, filed Apr. 16, 1971 entitled "Video Tape Cartridge and Cartridge Handling Apparatus" and assigned to the same assignee as the present application and invention.

I claim

1. In a video reproducer and/or recorder of the type which includes a vertical base plate on which is mounted a multiple rotary transducer assembly, a cartridge and tape stretch placement system for use with a cartridge of the type which includes a video tape supply and take-up means and which presents a stretch of tape comprising:

tape pick-up means mounted on the base plate and selectively operable to move a stretch of tape vertically upward out of the cartridge to wrap the stretch about a portion of the transducer assembly or to move downwardly to return the stretch to the cartridge, a cartridge container, pivot means for mounting said container so that it can swing between a rearwardly inclined and retracted position for initial cartridge acceptance and final return and a vertical and retracted intermediate position, means for slidably positioning the pivot means so that the pivot means and container can slide together linearly forwardly, to place the container in operating position whereat the stretch of tape is registered with the take-up means and said stretch is in proximity to the top of the cartridge and substantially perpendicular to the base plate, or rearwardly to place the container in said intermediate position, and means for defining the angular and linear displacements of the container and the pivot means, so that the container, starting in the cartridge acceptance position, is swung forwardly to the intermediate position and then displaced linearly forwardly to bring the cartridge into operating position, and further so that the container may be displaced linearly rearwardly and then swung rearwardly to place the cartridge in return position.

2. The system in accordance with claim 1 in which the displacements-defining means comprises a pair of side plates each having an arcuate slot formation and a connected linear slot formation, forwardly extending legs individually formed on each side of the container, and individual followers secured to the ends of the legs and projecting through the slot formations so that the followers move in the arcuate slot formations as the container rocks about the pivot means and further so that the followers move in the linear slot formations as the pivot means and container are displaced linearly.

3. The system in accordance with claim 2 in which the pivot means comprises a pair of bearings, one on each side of the container, and in which the means for slidably positioning the pivot means comprises a pair of integral slide formations for receiving the bearings, one on each side plate.

4. The system in accordance with claim 3 and means for biasing the bearings and the container toward operating position comprising a pair of racks, one outboard of each side plate, a pair of pinions, each enmeshed with one of said racks, a pair of tie bars each having a front end and a rear end formed to be linearly displaced with its respective one of said bearings, pinion mounts secured to the front ends and projecting through said linear slot formations, and means for urging the pinion mounts forwardly.

5. The system in accordance with claim 4 in which the means for urging the pinion mounts forwardly comprises a pair of rotatably mounted links formed with slots into which the pinion mounts project and over-center springs urging said links to turn to move the pinion mounts forwardly.

6. In a video reproducer and/or recorder of the type which includes a vertical base plate on which is mounted a multiple rotary transducer assembly, a cartridge and tape stretch placement system for use with a cartridge of the type which includes a video tape supply and take-up means and which presents a stretch of tape comprising:

tape pick-up means mounted on the base plate and selectively operable to move a stretch of tape vertically upward out of the cartridge to wrap the stretch about a portion of the transducer assembly or to move downwardly to return the stretch to the cartridge, cartridge transporting means comprising an outer container and an inner container movable in and with the outer container, releasable latch means responsive to the placement of the inner container in the outer container to latch the inner container in place, pivot means for mounting said outer container so that it can swing between a rearwardly inclined and retracted position for initial cartridge acceptance and final return and a vertical and retracted intermediate position, means for slidably positioning the pivot means so that the pivot means and outer container can slide together linearly forwardly, to place the outer container in operating position whereat the stretch of tape is registered with the take-up means and said stretch is in proximity to the top of the cartridge and substantially perpendicular to the base plate, or rearwardly to place the outer container in said intermediate position, and means for defining the angular and linear displacements of the outer container and the pivot means, so that the outer container, starting in the cartridge acceptance position, is swung forwardly to the intermediate position and then displaced linearly forwardly to bring the cartridge into operating position, and further so that the outer container may be displaced linearly rearwardly and then swung rearwardly to place the cartridge in return position, and means responsive to the rearward swinging of the outer container to release said latch means.

7. In a video reproducer and/or recorder of the type which includes a vertical base plate on which is mounted a multiple rotary transducer assembly, a cartridge and tape stretch placement system for use with a cartridge of the type which includes a normally closed cover and video tape supply and take-up means and which presents a stretch of tape comprising:

tape pick-up means mounted on the base plate and selectively operable to move a stretch of tape vertically upward out of the cartridge to wrap the stretch about a portion of the transducer assembly or to move downwardly to return the stretch to the cartridge, a cartridge container, pivot means for mounting said container so that it can swing between a rearwardly inclined and retracted position for initial cartridge acceptance and final return and a vertical and retracted intermediate position, means for slidably positioning the pivot means so that the pivot means and container can slide together linearly forwardly, to place the container in operating position whereat the stretch of tape is registered with the take-up means and said stretch is in proximity to the top of the cartridge and substantially perpendicular to the base plate, or rearwardly to place the container in said intermediate position, means for defining the angular and linear displacements of the container and the pivot means, so that the container, starting in the cartridge acceptance position, is swung forwardly to the intermediate position and then displaced linearly forwardly to bring the cartridge into operating position, and further so that the container may be displaced linearly rearwardly and then swung rearwardly to place the cartridge in return position, and means secured to the base plate for opening said cover as the cartridge is moved linearly toward operating position and for closing said cover as the cartridge is retracted linearly away from the operating position.

* * * * *